United States Patent [19]

Dobbins et al.

[11] Patent Number: 5,509,123
[45] Date of Patent: Apr. 16, 1996

[54] DISTRIBUTED AUTONOMOUS OBJECT ARCHITECTURES FOR NETWORK LAYER ROUTING

[75] Inventors: Kurt Dobbins, Bedford; Kris Dobbins, Goffstown, both of N.H.; Len Cormier, Leominster, Mass.; Kevin Yohe, Nashua, N.H.; William Haggerty, Dunstable, Mass.; Paul Simoneau, Londonderry; Rich Soczewinski, Windham, both of N.H.

[73] Assignee: Cabletron Systems, Inc., Del.

[21] Appl. No.: 216,541

[22] Filed: Mar. 22, 1994

[51] Int. Cl.⁶ .............................. G06F 13/14; H04J 3/26
[52] U.S. Cl. .............................. 395/200.15; 395/200.1; 395/200.11; 395/200.12; 370/60; 370/94.1
[58] Field of Search .................... 395/200, 325, 395/500, 200.1, 200.11, 200.12, 200.15; 370/60, 94.1; 395/200.1, 200.11, 200.12, 200.15

[56] References Cited

U.S. PATENT DOCUMENTS

| | | | |
|---|---|---|---|
| 5,088,032 | 2/1992 | Bosack | 395/200 |
| 5,095,480 | 3/1992 | Fenner | 370/94.1 |
| 5,142,622 | 8/1992 | Owens | 395/200 |
| 5,161,192 | 11/1992 | Carter et al. | 380/48 |
| 5,224,098 | 6/1993 | Bird et al. | 370/94.1 |
| 5,226,120 | 7/1993 | Brown et al. | 395/200 |
| 5,251,205 | 10/1993 | Callon et al. | 370/60 |
| 5,261,044 | 11/1993 | Dev et al. | 395/159 |
| 5,274,631 | 12/1993 | Bhardwaj | 370/60 |
| 5,301,303 | 4/1994 | Abraham et al. | 395/500 |
| 5,309,431 | 5/1994 | Tominaga et al. | 370/60 |
| 5,313,465 | 5/1994 | Perlman et al. | 370/85.13 |
| 5,317,568 | 5/1994 | Bixby et al. | 370/85.6 |
| 5,351,237 | 9/1994 | Shinohara et al. | 370/58.3 |

FOREIGN PATENT DOCUMENTS

| | | |
|---|---|---|
| 0405829A3 | 1/1991 | European Pat. Off. . |
| 0549504A2 | 6/1993 | European Pat. Off. . |

*Primary Examiner*—Ken S. Kim
*Attorney, Agent, or Firm*—Wolf, Greenfield & Sacks

[57] ABSTRACT

An object-oriented architecture for network layer routing is provided which distributes function and system behavior into autonomous router objects. By distributing these functionalities into each object, the services and data normally external to the object are imbedded or accessible within the object itself. In another sense, some objects are distributed across the network; e.g., a separate forwarding engine is provided at each network interface. In a preferred embodiment, each object has: (1) common, protocol-independent functions that are shared by all objects of that class; (2) their own configuration information; (3) accessibility through a router resource object for instantiation and control; (4) automatic persistence in NVRAM; (5) remote management capabilities; and (6) text names for navigation of a resource tree as a file system. These capabilities are in every object regardless of the specific protocol or application. This ensures a common architecture among many different systems/router components, a common method of control internally, a consistent order of instantiation and a common functional behavior.

21 Claims, 22 Drawing Sheets

DISTRIBUTED AUTONOMOUS OBJECT ARCHITECTURES FOR NETWORK LAYER ROUTING

FIELD OF THE INVENTION

The present invention is directed to an apparatus and method for routing packets on a communications network, and more particularly to an object-oriented system which utilizes common protocol-independent base objects to instantiate protocol-specific objects and which distributes the critical function and system behavior into autonomous objects. The system supports multiple network and routing protocols, is manageable, and readily scales to new platforms, architectures and media technologies.

BACKGROUND OF THE INVENTION

Intelligent hubs are becoming widely deployed in networks to provide network connectivity to access devices. Hubs that provide access into the network allow the distribution of access policies and connectivity to occur close to the end system attachment.

At the same time, network-level routers are being deployed on a large scale to connect together the distributed hubs. In the past, this network service was provided by centralized router devices, as shown in FIG. 1A. However, as the centralized router's bandwidth and number of physical network interfaces become saturated, it is costly to add incremental distributed service. Once at capacity, it is necessary to add another centralized multi-port router even if the expansion only requires one new LAN to be attached— i.e., increments to the LAN access ports are done in large step functions.

To allow more scaleability, the router functions have been integrated into distributed hubs. As shown in Fig. 1B, this essentially "pushes" routing functionality out to the point where users gain physical connectivity into the network. In addition, these distributed routers can allow greater network access into a centralized router by off-loading the routing functions (FIG. 1C).

As the routing functionality pushes out and is more widely deployed, it places a tremendous strain on the configuration and control of these distributed devices. Also, because hubs provide for access by many LAN technologies, the router in a hub has to have support for a wide range of network connectivity in the same chassis. Furthermore, the number of access ports can vary from one or two, to several hundred, since these ports provide the connectivity to end users of the network.

To be able to implement routing services in these distributed hub and network devices, the architecture must be extremely flexible, scaleable, and adaptive to different hub configurations and chassis, and be able to support a variety of present and future protocols. Also, the architecture needs to provide a high degree of manageability since the operation and control of routing in these distributed hubs will be substantially more difficult due to the sheer number of these devices in a network and due to the variation of technology integrated in the hub/router.

SUMMARY OF THE INVENTION

The present invention is an apparatus and method for routing information on a communications network which provides a high availability of service, remote management and monitoring, and interoperability.

The system has an open-ended architecture, which means it is open to changing technologies, both in the underlying media as well as in the protocol, and open to expanding the size of the network.

In accordance with this invention an object-oriented architecture is provided which distributes the critical function and system behavior into autonomous router objects. All router objects have three types of imbedded functionality automatically built in, including:

1. The common protocol-independent functions of the object, which may be a routing function (e.g., forwarding information base, FIB) or a system function (e.g., event or timer). For example, all forwarding engines have a forward method as well as a service method regardless of the particular protocol;
2. The functions provided by a base resource object class which define the methods and data for configuration and control. For example, any object of the network interface class has network interface-configuration inside it automatically; and
3. The functions provided by the managed object class which define the methods and data for network management.

By distributing these functionalities into each object, each object becomes autonomous, i.e., the services and data normally external to the object are embedded or accessible within the object itself.

In another sense, some objects are distributed "across the network," i.e., as opposed to providing one central forwarding engine, in this invention a separate forwarding engine object is provided at each network interface.

All objects are connected through a router resource object, which instantiates all objects in an orderly fashion to allow binding and ordered start-up. Once the objects exist, they become autonomous in that each knows its own binding and object behavior defined in the base classes. The objects are also connected through a managed-object framework for management.

Thus, in a preferred embodiment, each object has:

1. Common, protocol-independent functions that are shared by all objects of that class;
2. Their own configuration information;
3. Accessibility through the router resource object for instantiation and control (enable, disable, etc.);
4. Automatic persistence in NVRAM if required;
5. Remote management capability;
6. Text (e.g., ASCII) names for navigation of a resource tree as a file system.

These capabilities are in every object regardless of the specific protocol or application. This ensures a common architecture among many different system/router components, a common method of control internally, a consistent order of instantiation and a common functional behavior (even in different protocol suites which are, in networking semantics, completely unrelated).

Because the router processes packets at network level, it needs to understand and decode various network level packets. Some of the most prevalent network protocols are:

IP (Internet Protocol for the TCP/IP protocol suite)
Novell IPX
Xerox XNS
Banyan Vines IP
ISO CLNS
DECNET AppleTalk While the router may not implement all possible network protocols, it is possible to add additional protocols with a minimum of coding changes.

In addition, the router is able to support a number of different routing protocols. Within the Internet community, the following are commonly used:

RIP (Routing Information Protocol)
OSPF (Open Shortest Path First)
Dual IS-IS (Intermediate to Intermediate System)

The router also supports a variety of communications media, and is able to interface the network protocols to the media drivers.

Other aspects of the present invention will be more fully described in the following drawings and detailed description.

DETAILED DESCRIPTION

Figure 1A:
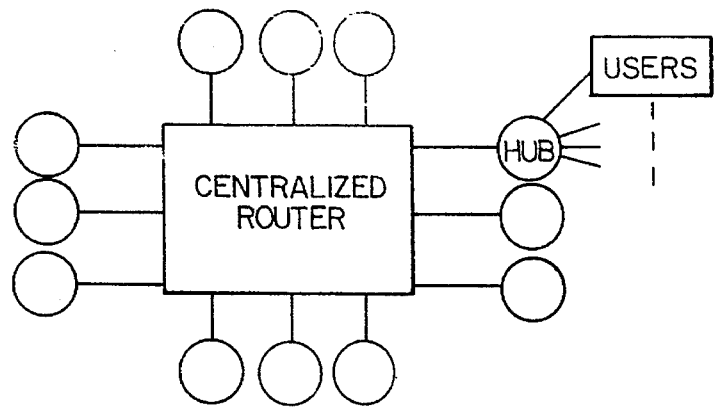
FIG. 1A is a schematic illustration of a network utilizing a centralized router.
Figure 1B:
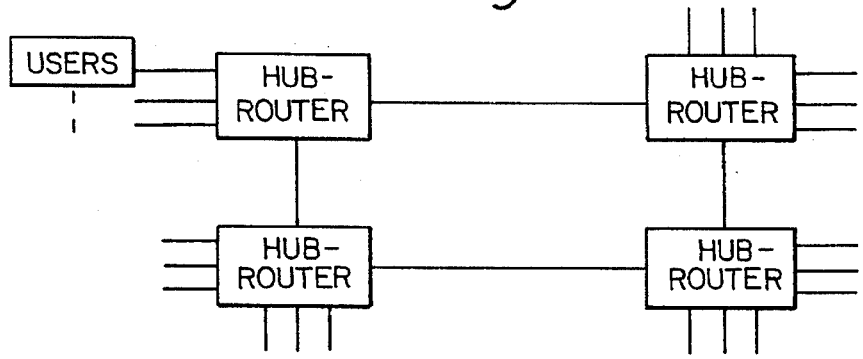
Fig. 1B is a schematic illustration of a network utilizing distributed hub-routers.
Figure 1C:
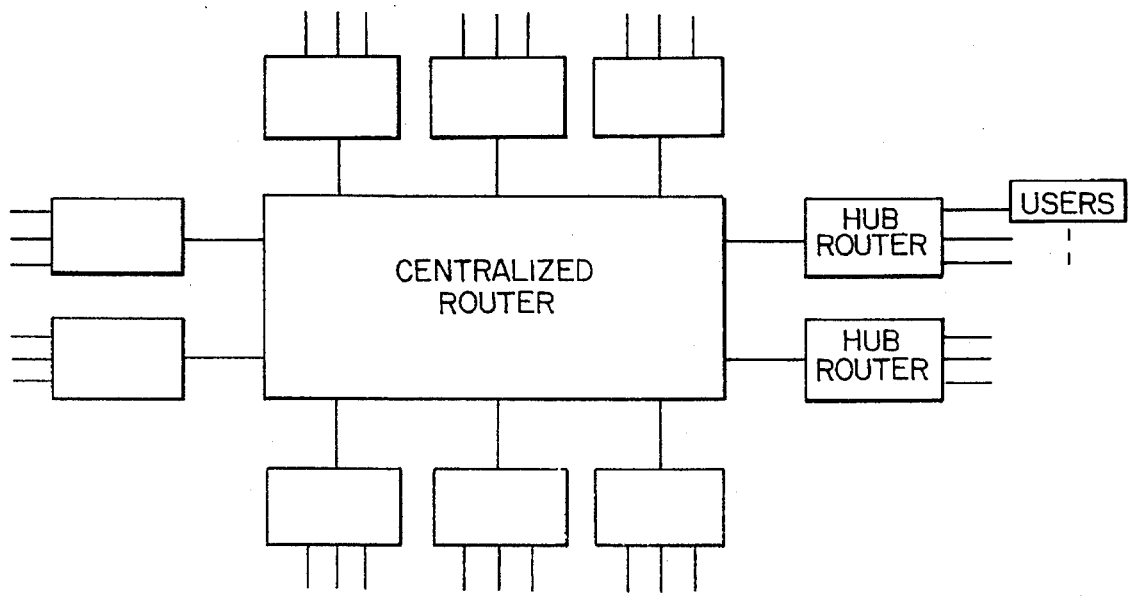
FIG. 1C is a schematic illustration of a network utilizing both a centralized router and distributed hub-routers.
Figure 2A:
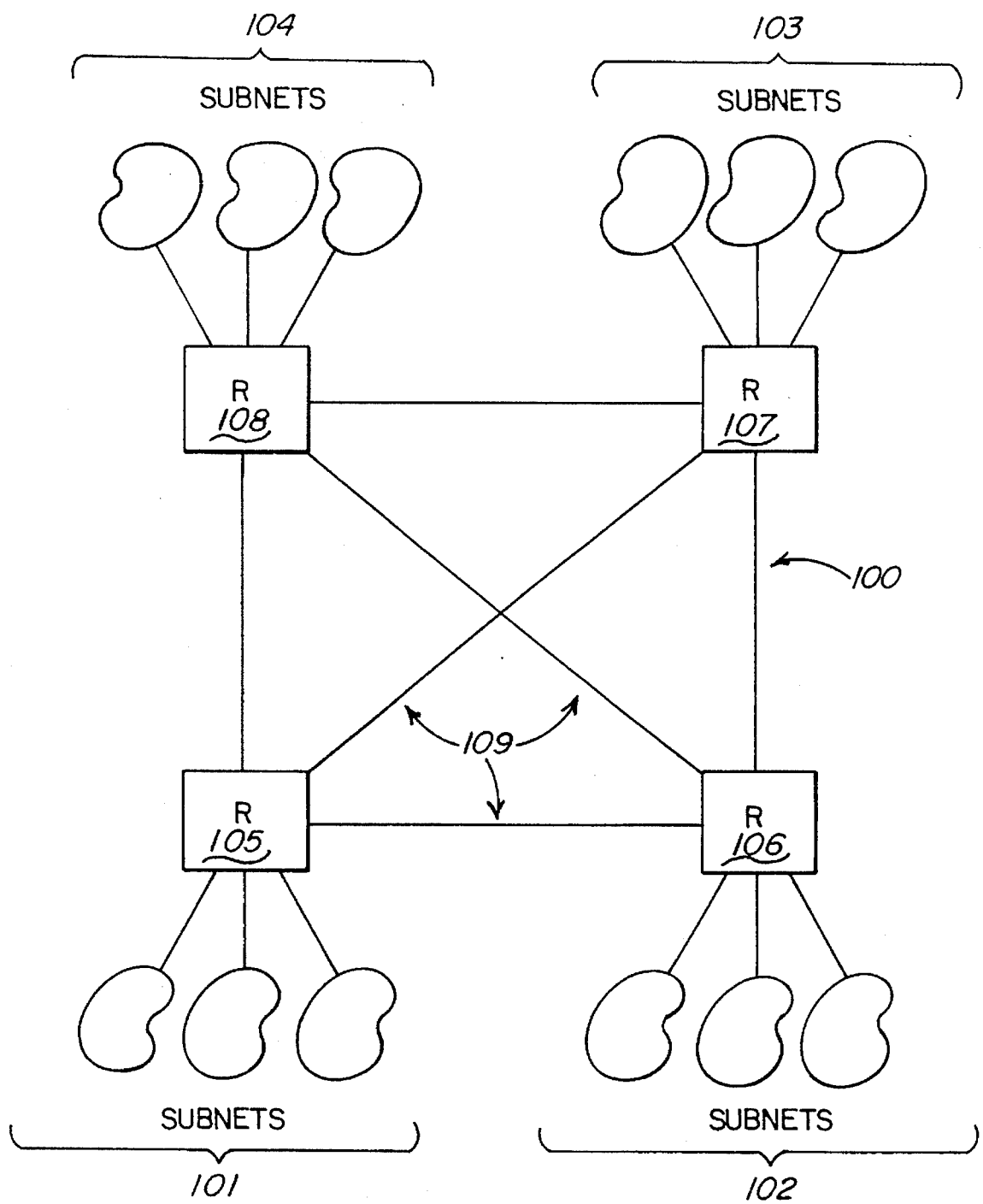
FIG. 2A is a schematic illustration of a network utilizing a plurality of distributed routers according to one embodiment of this invention.

FIG. 2A shows one embodiment of a network utilizing the routing apparatus and methods of this invention. The network 100 is illustrated schematically as four subnets 101, 102, 103, 104 each connected to one of four routers 105, 106, 107, 108, respectively. Each subnet may comprise, for example, a plurality of LANs, each connected to a port of its associated multiport router. The four routers are connected by links 109. In this embodiment, the routers are pushed outwardly in the network (as opposed to a central router backbone) and serve as network access points. This provides scaleability as the network can be easily expanded by adding another router and associated subnets. Each router has an adaptive architecture so it can handle multiple protocols and is subject to remote management, so that the entire network can be managed "as a whole."

Figure 2B:
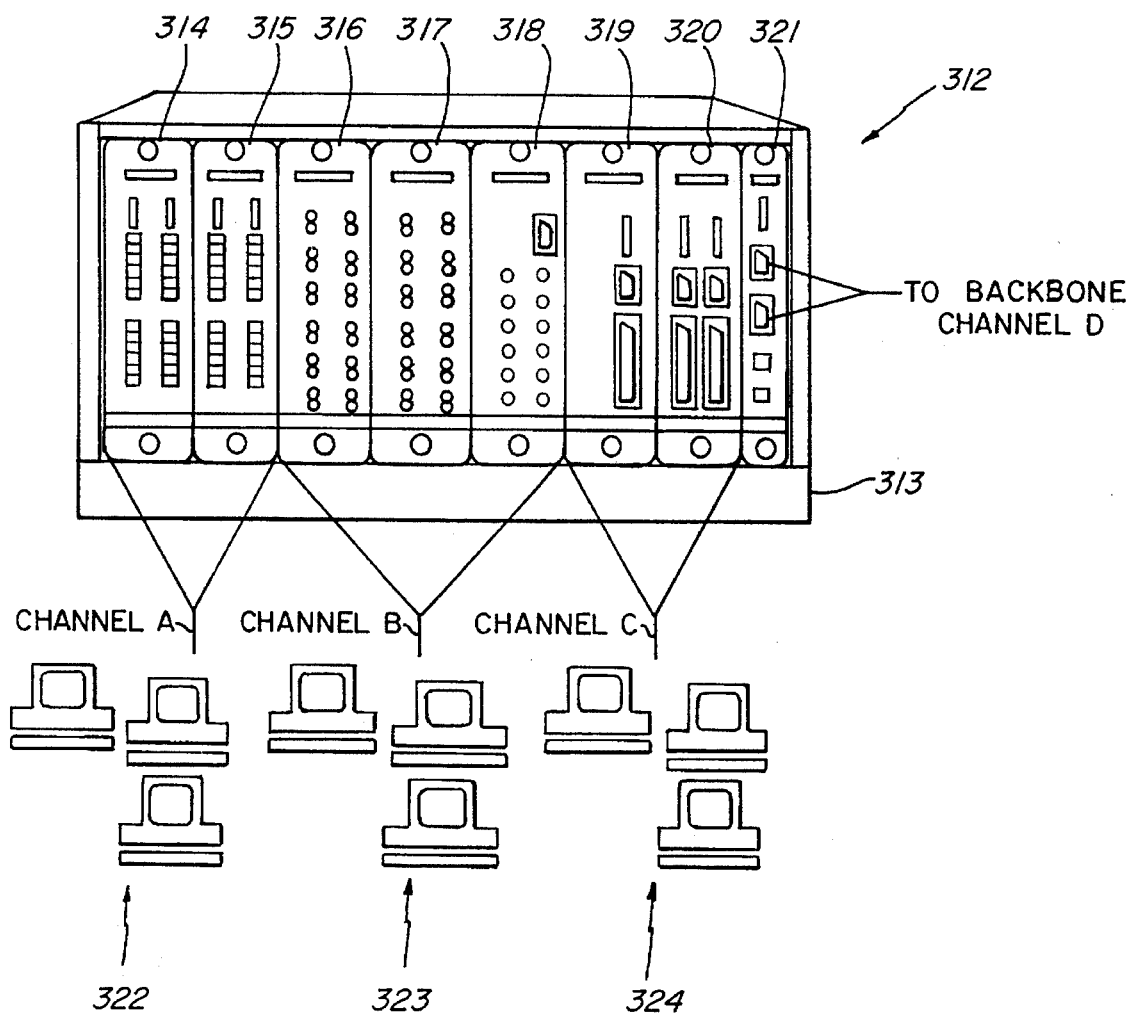
FIG. 2B is an illustration of a hub-router according to one embodiment of this invention.

FIG. 2B illustrates an intelligent hub-router 312 for use in the network of FIG. 2A. The hub-router has a chassis 313 with a plurality of plug-in modules 314–321. The hub accesses three separate subnets 322, 323, 324 on each of channels A, B and C, respectively. Each channel is equivalent to a network interface. Thus, modules 314–315 provide access on channel A to first subnet 322; modules 316–318 provide access on channel B to second subnet 323; and modules 318–320 provide access on channel C to third subnet 324. The module 321 then provides access on channel D to the network backbone, i.e., the other routers in the network of FIG. 2A.

This invention utilizes "object-oriented programming" as defined in Grady Booch, "Object-Oriented Analysis And Design, With Applications," Second Edition, Benjamin Cummins Publishing, 1994, which is hereby incorporated by reference in its entirety. The data and operations are united into fundamental logical building blocks of classes and objects. Object-oriented programming may be defined as a method of implementation in which programs are organized as cooperative collections of objects, each of which represents an instance of some class, and whose classes are members of a hierarchy of classes united via inheritance relationships. See Booch, Chap. 2. Well-known object-oriented languages include C++, SmallTalk, Object Pascal, CLOS, and Effifel. In the embodiment described herein, the C++ language is utilized.

The terms "router" and "routing apparatus" are used broadly in this specification to include software and hardware that can forward packets at the network layer and can exchange network topology information used in a variety of exchange protocols.

In this specification, "network" is used generally to include local area networks, wide-area networks, and several networks connected together by gateways (or routers), known as an internet.

The router of this invention will now be more particularly described in the following subsections:

A. Framework

B. Forwarding Engine
  B.1 Forward and Service
  B.2 Cache
  B.3 Access List
  B.4 Framing
  B.5 Event Funnel C. Routing Protocols D. Managed Objects E. Common MIB Template F. Common Base Router Resource G. MIB Navigator

A. FRAMEWORK

Internetworking and communication systems are typically built around a set of discrete subsystems. While these discrete subsystems may be be highly integrated, they operate as functionally separate parts. For example, process functions exist separately from configuration data and network management. In addition, when multiple communication protocol stacks are supported, each exists as a completely different "vertical" stack, e.g., IP Stack, IPX Stack, DECnet Stack, with totally separate configuration, control, monitoring, network management, and protocol-specific behavior/functionality. Think of each communication stack as an application which can exist independently of other stacks which may be implemented.

The distributed object architecture of the present invention defines all of the functional aspects to implement a generalized, common protocol-independent framework which is inherited by every protocol-specific object upon instantiation. At system startup/initialization, a Router Resource object instantiates all objects in an orderly fashion to allow binding and ordered start-up. Once the objects exist, they become autonomous in that each knows its own binding and object behavior defined in the base classes.

Figure 3A:
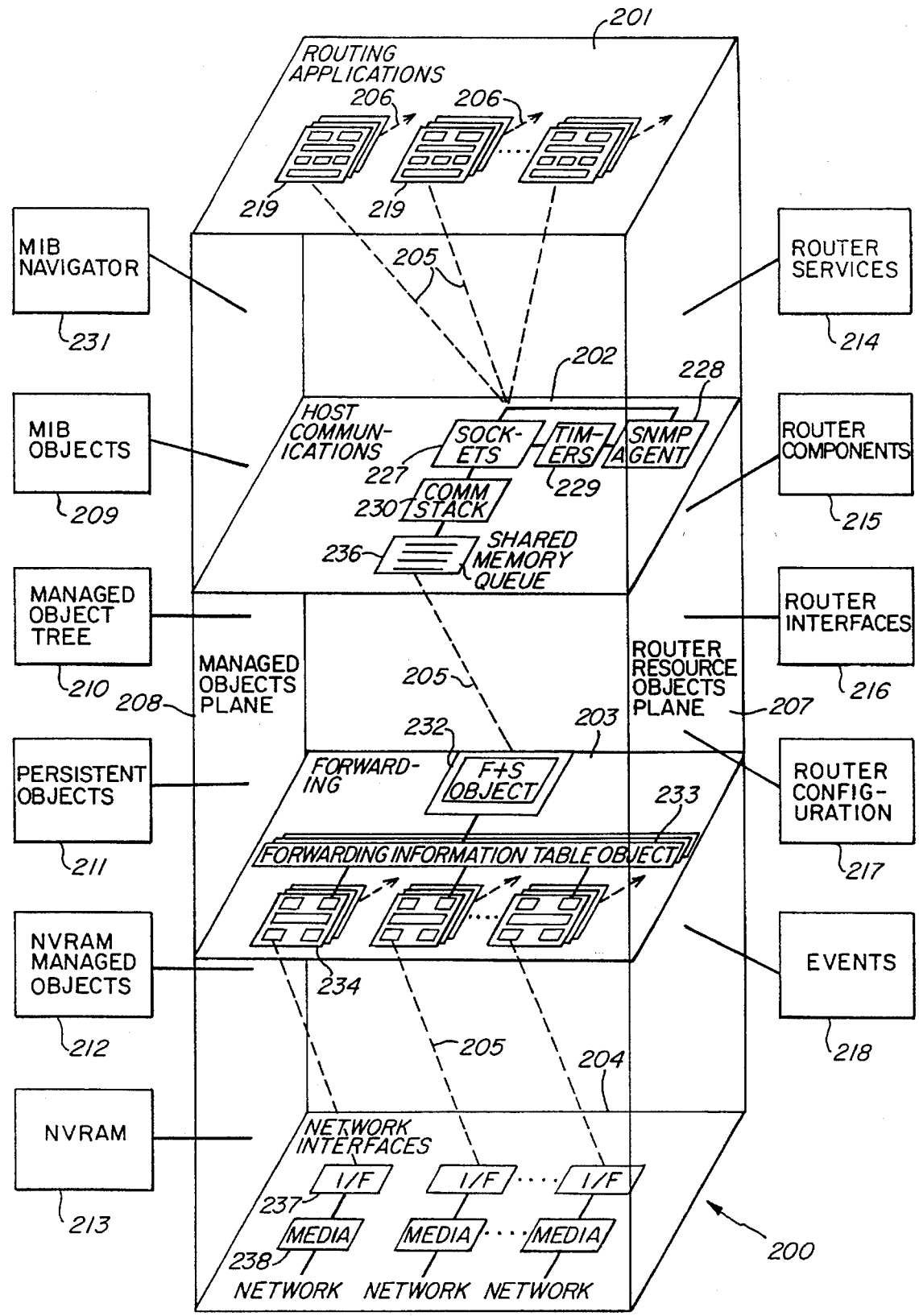
FIG. 3A is a three-dimensional system architecture view of the router of this invention, showing each functional subsystem on a separate "plane"

FIG. 3A is a three-dimensional view of the system architecture according to this invention showing the logical relationships between objects and wherein each functional subsystem is shown as a separate "plane." Thus, system architecture 200 includes four horizontally disposed planes: routing applications 201; host communications 202; forwarding 203; and network interfaces 204. Objects that are "tiled" show that multiple instantiations can exist; for example, the forwarding and routing protocol objects 234 in plane 203 are instantiated for each individual protocol. The rearwardly directed dashed arrows 206 show that additional instances can exist. Connections between the different planes are shown by dashed lines 205. These logical connections are through resource objects and a naming tree.

FIG. 3A also shows that all objects are connected through a vertical router resource objects plane 207. At the same time, all objects to be managed are connected through a vertical managed object plane 208.

Figure 3B:
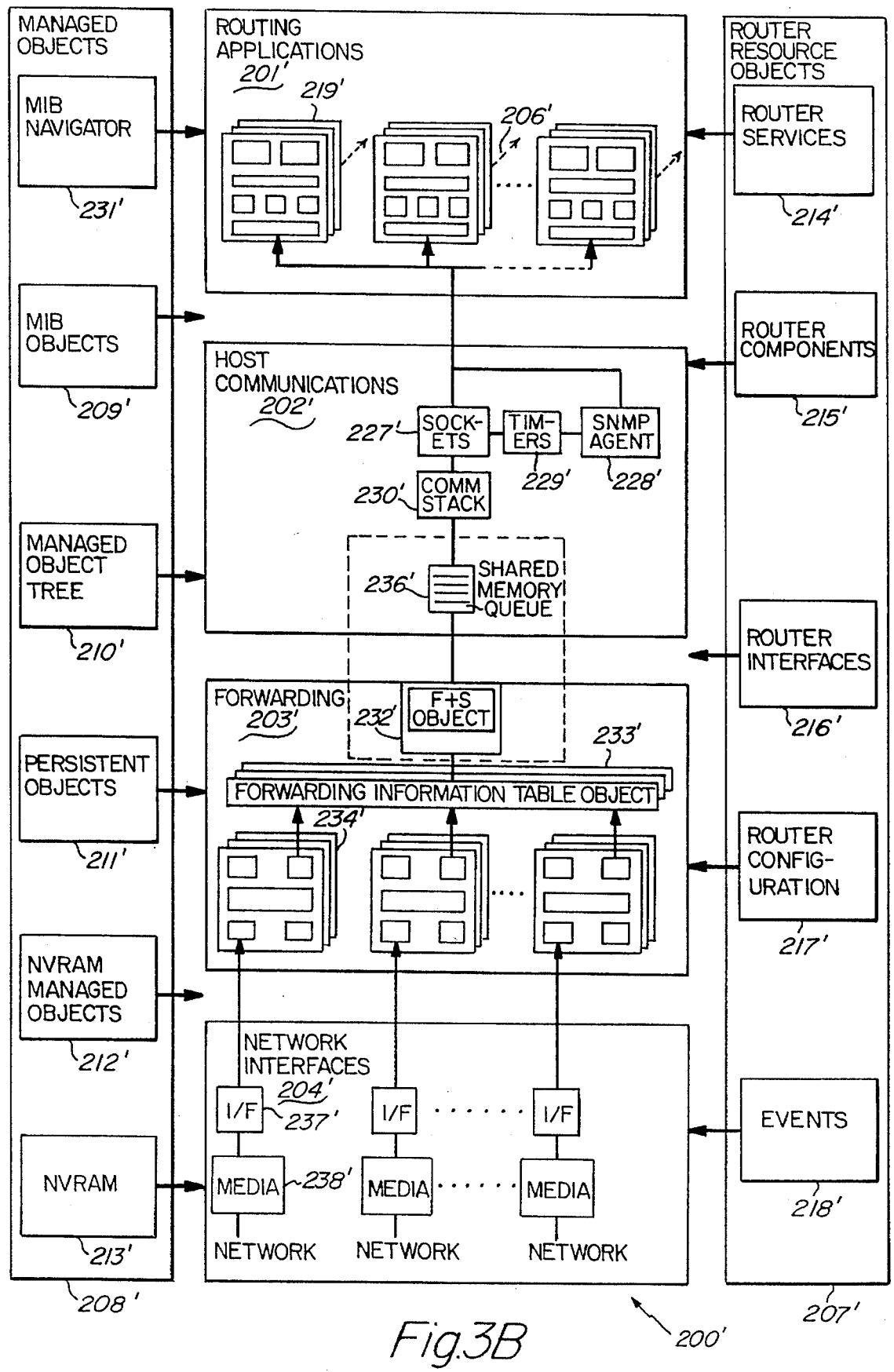
FIG. 3B is an alternative view of the system architecture as a "flat" system.

The system architecture can alternatively be viewed in FIG. 3B as a "flat" system, wherein corresponding elements are identified with a prime designation. Again, all manageable objects are connected to managed objects 208', which include MIB objects 209', MIB tree 210', persistent objects 211', NVRAM managed objects 212', NVRAM 213', and MIB navigator 231'. Similarly, all objects are connected to router resource objects 207', including router services 214', router components 215', router interfaces 216', router configuration 217', and events 218'.

Figure 3C:
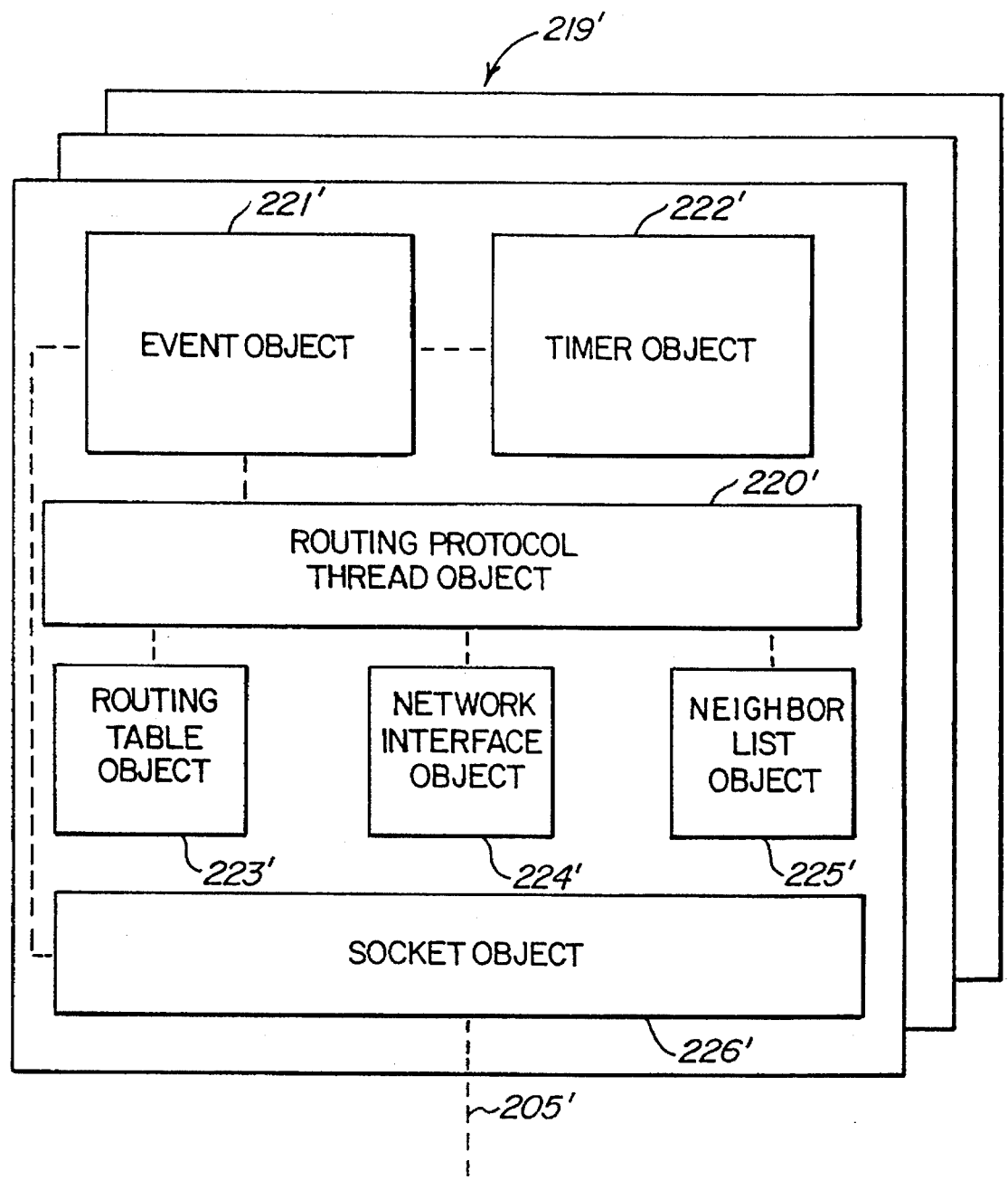
FIG. 3C is a schematic illustration of a routing protocol object, for a distance-vector protocol such as RIP.

FIG. 3B shows more clearly the connections between routing applications 201', host communications 202', forwarding services 203', and network interface services 204'. Starting from the top, a routing protocol object 219' is instantiated for each routing protocol, such as the RIP distancevector protocol. The routing protocol object 219' is further illustrated in FIG. 3C to include routing protocol thread object 220', which is connected to each of event object 221', routing table object 223', network interface object 224', and neighbor list object 225'. The event object 221' is further connected to timer object 222' and socket object 226', the latter of which is connected via line 205' (see FIG. 3B) to sockets 227' in host communications 202'. Returning to FIG. 3B, host communications 202' further includes SNMP agent 228', timers 229' and host communication stack 230', all connected to sockets 227'.

Figure 3D:
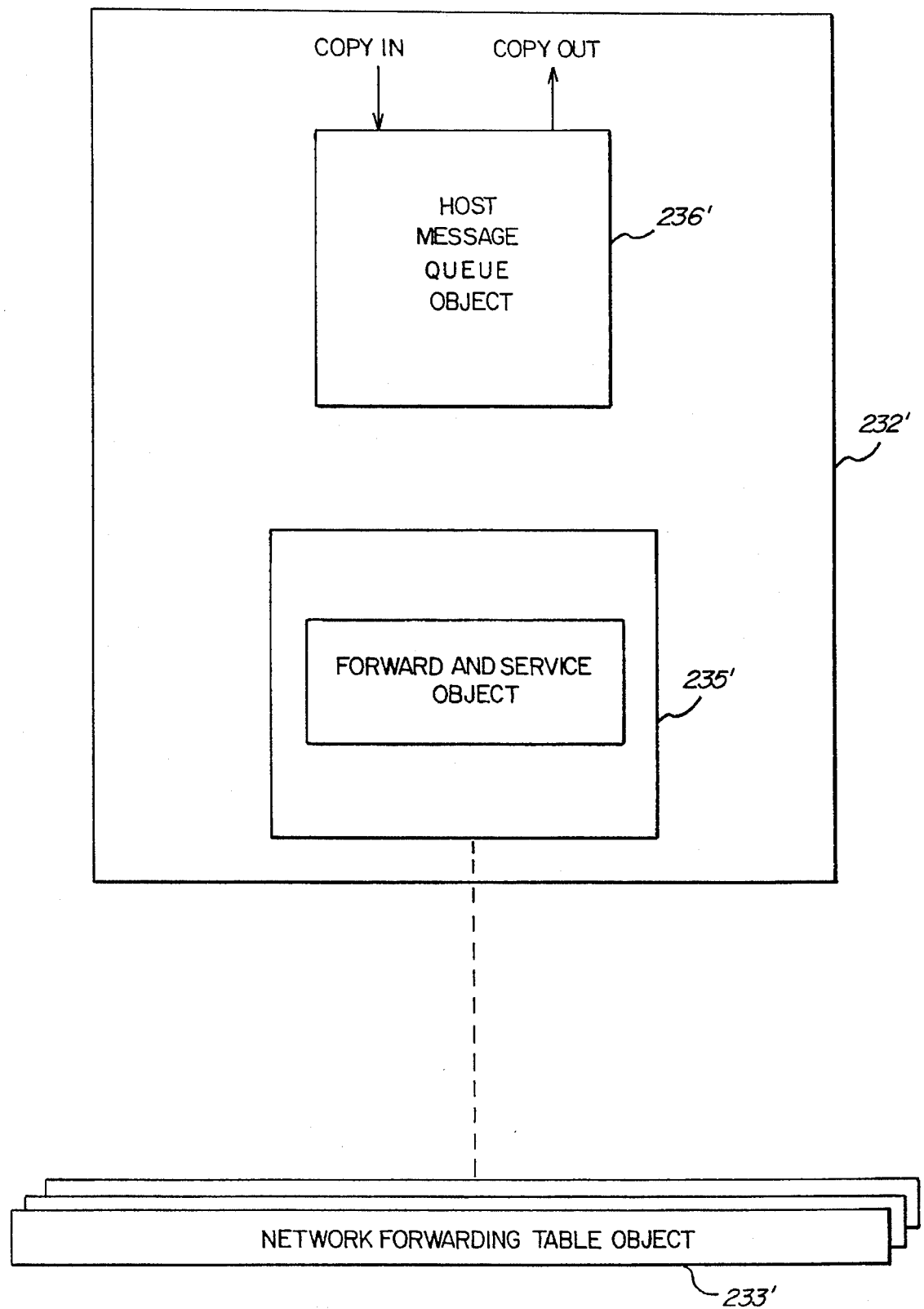
FIG. 3D is a schematic illustration of a "host" forwarding engine object.

The host communication stack 230' is connected via a shared memory queue 236' to a host forwarding engine 232', which is described more fully in FIG. 3D. The engine 232' includes forward and service object 235' which accesses the host memory via host message queue object 236', which is shared between host communications 202' and forwarding services 203'. The forward and service object 235' also accesses the network forwarding table object 233', also known as the forwarding information base (FIB).

Figure 3E:
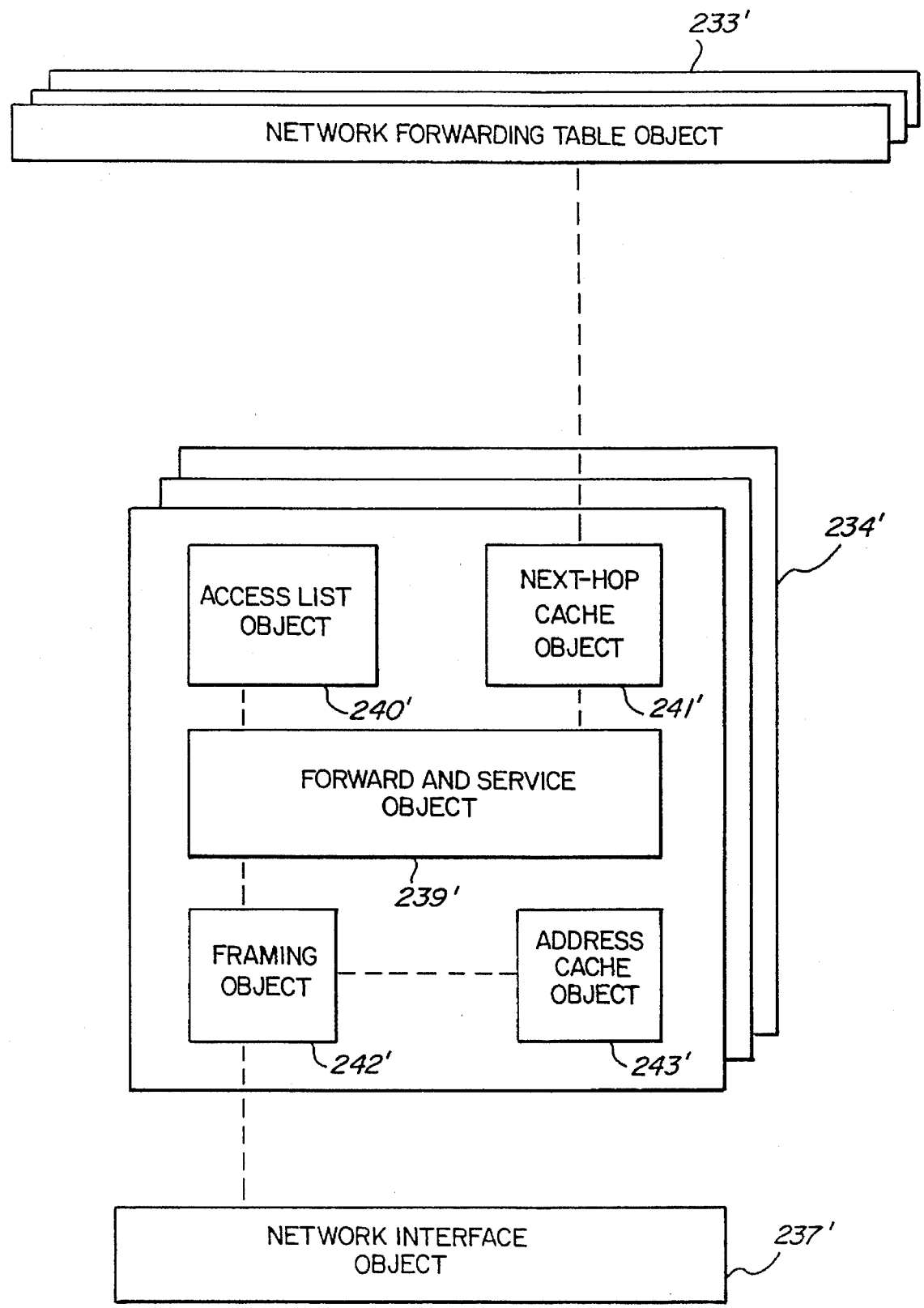
FIG. 3E is a schematic illustration of a "protocol" forwarding engine object.

Returning to FIG. 3B, the forwarding information base 233' is connected to each of a plurality of "protocol" forwarding engines 234' which are further illustrated in FIG. 3E. The protocol forwarding engine object 234' includes a forward and service object 239' connected to each of an access list object 240', a next-hop cache object 241', and a framing object 242'. The framing object 242' is connected to each of address cache object 243' and network interface object 237'. The next-hop cache object 241' is connected to the network forwarding table object 233', or FIB in FIG. 3B. Returning to FIG. 3B, each network interface object 237' is connected below to a network media device driver 238'.

In summary, the architecture includes each of the following subsystems:

1. Managed Objects allow router objects to have embedded network management for remote configuration, monitoring, and control. This framework allows any data element or object to be given "management" visibility which includes a unique object identifier and name. In cases where the router object's value needs to be retained and restored through system resets and re-starts (power cycle), the framework allows the object to make itself persistent by saving and restoring itself (using the NVRAM file system). This functionality is transparent to the actual object.

2. Resource Objects provide for a common system template (boilerplate) regardless of the protocol-specific object. They also enforce a common MIB (managed information base) structure and content which makes every router application in the system look and be controlled the same. This is provided to protocol suites that may be fundamentally different.

3. Forwarding Objects provide a distributed forwarding architecture that scales to new network interfaces and media types. It provides a protocol-independant framework for switching network packets, as well as for delivering packets internally to the upper-layer protocol applications. Reframing between different media types is also provided since each object is bound to a particular network interface.

4. Routing Protocol Objects provide the ability to exchange network topology information and determine next-hop routes used for packet network forwarding.

These objects will be further described in the following subsections.

B. FORWARDING ENGINE

B.1 Forward and Service

Traditional communication architectures use a layered model with each layer providing a service of transmit and receive. Typically a packet enters a device on some network interface and gets handed to the protocol layer sitting above the interface. This protocol layer in turn processes the packet and hands it off to the next layer above. In the case of a router, the network layer would eventually process the packet, determine the interface it has to be forwarded on, and send the packet back down each layer until it is eventually transmitted out the forwarding interface.

In this prior model, each protocol always gets the packet and then decides if it was appropriate for the interface. It is a centralized model with the protocol layer being the funnel for all packets entering and exiting the system regardless of the interface the packet came in on. Also, because it is centralized, each layer must have knowledge about every specific interface. For example, all configured interface information such as MTU size, forwarding enabled/disabled state, configured network addresses and masks, data-link framing options, filter access lists, etc, must be accessed by each layer as it processes/forwards the packet. This model puts overhead into each layer and is very limiting in supporting new interfaces, media, and protocols, as each layer must be modified. An example of overhead is that if a packet is received for a protocol that is not enabled, it is not dropped until it has been passed up to the correct protocol layer.

Figure 4:
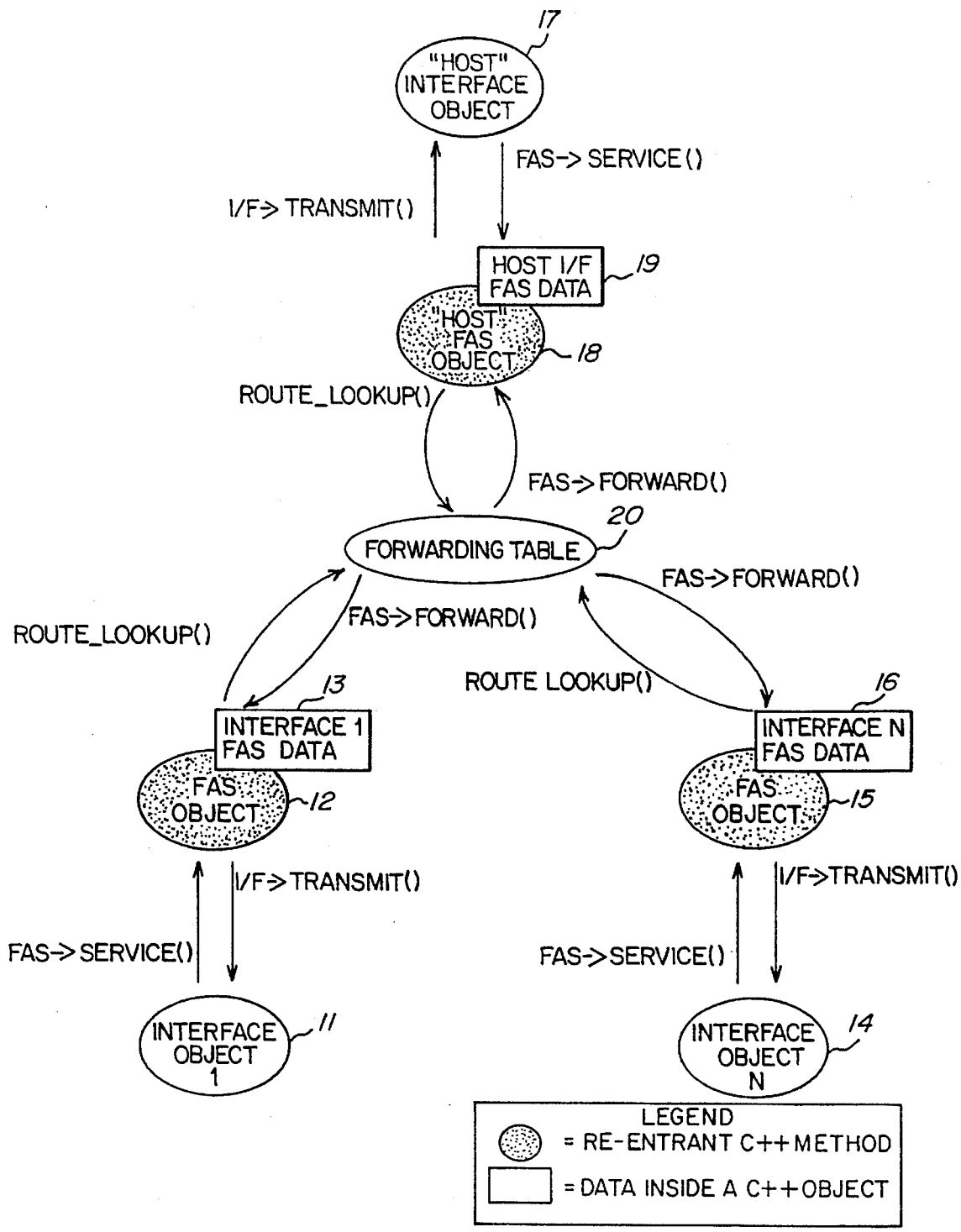
FIG. 4 is a flow diagram illustrating the service and forward methods of the distributed autonomous forwarding engines.

In contrast, this invention utilizes distributed autonomous forwarding engines as shown in FIG. 4. Rather than having a single centralized forwarding engine, in the distributed model each interface 11, 14, 17 has a forwarding engine 12, 15, 18 sitting above it, and each forwarding engine knows how to receive and transmit packets on its own interface. Also, each engine only knows its own configuration information and only knows how to receive and transmit packets on the one interface it is associated with. Each forwarding engine accesses a common forwarding table 20.

NOTE: The interface objects 11, 14 of FIG. 4 are the same as network interface objects 237' in FIGS. 3B and 3E, with FAS objects 12, 15 (FIG. 4) corresponding to objects 239' (FIGS. 3B and 3E). The host interface object 17 (FIG. 4) corresponds to host message queue 236' (FIGS. 3B and 3D), with host FAS object 18 (FIG. 4) corresponding to FAS object 235' (FIG. 3B). The forwarding table 20 (FIG. 4) corresponds to FIB 233' (FIG. 3B).

In order to provide a consistent-forwarding model for packets destined for "local" delivery into the "host" CPU, the host is treated as an internal interface with a destination address. The delivery of host destination packets remains in band to the forwarding function.

The operation of the forwarding engine can now be described with regard to FIG. 4. In response to receipt of a data packet on interface object-1 (11), the interface object 11 calls a service method in its bound forwarding engine object 12. The service method removes the sublayer framing on the network packet and performs a validation and extraction of the destination network address from the network packet. The service method then provides a next-hop determination by looking up the destination network address in a cache memory of active addresses to determine a destination forwarding engine object handle, and, if the destination network address is not located in cache memory, accessing a forward look-up table 20 for the best route to the destination network address, and then updating its cache. The method then returns the destination forwarding engine object handle.

Assuming the destination is interface N, upon receipt of the destination forwarding engine object handle, a service method is called in the destination forwarding engine object 15. The service method validates the destination address, performs a look-up in an address cache to obtain a media specific address of the destination, and the service method then reframes the packet and transfers it to the destination interface 14.

Alternatively, if a local delivery into the host CPU is required, the host FAS object 18 is called and the packet is transmitted out on the host interface 17.

In this model, each forwarding engine acts independently to process packets, yet they each unknowingly interact together to collectively provide a system-wide forwarding subsystem which is protocol independent, interface independent, and very scalable (supports 1 to n interfaces).

The forwarding engines of this invention are implemented using object-orientated methodology and are written in the language C++. By having C++ objects, each forwarding engine has its own data portion 13, 16, 19 that is specific to itself, e.g., interface and media information, address resolution tables, configuration information, etc. However, the method portion 12, 15, 18 of each engine is common and is shared by all similar engines.

The specific goal of the each forwarding engine is to provide the reception, processing, and forwarding of network layer packets. At a very high level, all forwarding engines perform these same basic tasks regardless of protocol or media.

Because all engines perform the same basic tasks, each protocol engine is derived from a common Base Class. This allows a generic and common interface to each engine regardless of protocol. Specifically, this Base Class defines the following virtual methods which are then overloaded by each protocol engine that is derived from this Base Class:

service(packet_descriptor_pointer)

forward_$net$_packet(packet_descriptor_pointer)

forward_$host$_packet(packet_descriptor_pointer)

The service function refers to the actual in-bound processing of a network layer packet which consists of the following:

reception of the packet from the data link layer validation and error processing filter processing route lookup processing to determine the next hop The forward function refers to the actual out-bound processing of a network layer packet which consists of the following:

filter processing converting network layer address to physical address passing the packet to the data link layer of the outbound interface for transmission.

By having protocol-specific Forwarding and Service (FAS) engines derived from a common base class, each protocol forwarding engine has a generic interface for packet servicing and forwarding, regardless of the specific protocol type. This is done on the service side by having each protocol FAS register a pointer to its base class with a packet dispatcher at the data link level for each interface it is instantiated on. This allows a packet dispatcher to invoke the overloaded virtual service method without having to know protocol FAS specifics, i.e.,

```
switch ( registration_table_lookup (protocol) )
{
case PROTOCOL_REGISTERED:
    registration_table[protocol].FAS_Ptr->service
        (Pkt_descr_ptr); break;
case PROTOCOL_NOT_REGISTERED:
    break;
}
```

The service function for the specific protocol FAS on a particular interface is invoked only when network layer packets for that protocol are received on that interface.

The same concept holds true on the forwarding side. Each protocol FAS registers itself with the forwarding table for that protocol. This is done by registering its network address and masks along with a pointer to its base class with the internal forwarding table. This table is used by the service method of each protocol FAS to determine which FAS should be invoked to forward the packet, i.e., FAS_ptr=Forwarding Table_Lookup (Destination_Network_Address);

Fas_ptr→forward_net_packet (pkt_descr_ptr);

This allows the service portion of the FAS that was instantiated on the interface the packet was received on, to forward the packet to the FAS which was instantiated on the interface the packet should be transmitted out on. This is effectively interface independent, as the binding is done via the Forwarding Table Lookup dynamically, and is based upon each FAS that exists (1 to n) registering itself and the network it is instantiated on with the Forwarding Table.

B.2 CACHE

Performance-sensitive code often employs caching to speed up performance. Typically, hash codes are used to speed retrieval of the cached data. The UNIX operating system, for example, keeps a number of such caches internally.

Routers must make a forwarding decision for every packet received as to what interface and next hop gateway to forward to. The decision is laborious because a number of competing route choices exist in the Forwarding Information Base (FIB), and the best route must be selected based on address match, metrics, quality of service, route type or class, network versus subnet granularity, etc. Once the route decision is made, it is common in router applications to cache that choice to speed up the decision for later packets having the same destination. How this caching is implemented varies wildly but is typically kept of small fixed size and is feature poor.

This invention comprises an object-oriented and feature-rich caching to provide a short-cut handling for later packets received with the same source and destination addresses. A separate cache exists for each network interface by containing cache objects in each forwarding engine (see for example next-hop cache object 241' and address cache object 243' in FIG. 3E).

B. 2.1 Base Class

This invention provides a base class ACache which is protocol independent. Addresses are kept as unsigned long integers. ACache does not support management set static entries; it is strictly dynamic. ACache supports:

dynamic growth or shrinkage in the cache size aging out of cache entries to keep cache size down flushing entries when external management events occur setting dynamic entries keyed by hashing source/destination ACache has its own thread context. An entry is set in the cache in an interrupt service context. If it reaches a high-level mark for cache size, the ACache set entry procedure hits an internal event to wake ACache back up in thread context. It then allocates more memory for the cache. Likewise when its aging timer expires, ACache wakes up in thread context in its aging procedure and may choose to shrink the cache at that time if a low-level mark is reached.

Flushing the whole cache is a fast way to keep caches current when certain external management events occur; the alternative is to walk caches on all interfaces to check if the external management affected entries are in that cache.

Setting an entry is done by hashing the source and destination addresses into a one byte hash code and linking the entry into a "bucket" quickly accessible by that code. The entry itself has a generic base class as seen by ACache, but what is actually stored is a derived entry which may contain protocol-specific data. This allows each cache to function exactly the same regardless of specific protocol-derived classes.

B.2.2 Protocol-Specific Derived Class

Individual network protocols may provide a class derived from ACache to (1) add protocol specific data to an entry and (2) supply the protocol-specific lookup routines. For example, the IP derived class is IPACache.

As part of forwarding packets, the IP forwarding engine methods (1) validate packet addresses, (2) filter against an access list, and (3) retrieve the next hop from the FIB. These procedures are inherently slow, so the results of these procedures once obtained, such as address validity, are cached and corresponding procedures are provided in IPACache to lookup the same results quickly.

IPACache thus supports three cache lookup procedures:

Martian (invalid) addresses access control list filtering next hop.

Each of these procedures is passed the source and destination addresses from a packet, hashes them and looks up entries linked in the "bucket" for that hash code. It checks each linked entry to see if it matches exactly both the source and the destination. If it finds a match it returns the entry data for that function. For the Martian lookup the address validity, yes or no, is returned. For access control lookup (see access list object 240' in FIG. 3E) an additional protocol and port parameter must be matched and permission, permit or deny, is returned. For next hop a quality of service parameter must be matched and the next hop is returned.

These lookup procedures are called in the context of an interrupt service routine attempting to forward the packet; they are coded to be fast. However, the cache may be temporarily inactive—say it is being flushed in a thread context due to an external management event, such as the deletion of an access list entry. In this case, the cache lookup routine simply falls back on the original, slow procedure which made the decision when the entry was cached, effectively bypassing the cache.

B.2.3 Network Management Visibility

Through the use of a common base router resource class, each protocol includes in the forwarding part of its protocol-specific MIB a table of entries keyed by interface number. Some of the leaves in an entry are associated with this packet caching. Each interface maintains its own cache. Individual entries in a cache are not MIB visible; these leaves concern the cache as a whole:

whether or not it is enabled, the maximum size it will be allowed to grow to, how many entries are currently in that cache, the number of cache hits since the cache was enabled the number of cache misses since the cache was enabled.

B.3 ACCESS LIST

In general, routing applications allow network management to filter packets based on destination address, or on the combination of destination and source addresses. It is desirable that each interface of the router be able to maintain a separate set of filter instances—an access list. Most vendors use a linear mechanism and since the list must be checked for each packet being forwarded, throughput slows down linearly as the list gets larger.

This invention provides a mechanism by which the forwarding of network packets is subject to access control set by network management.

To provide an object-oriented, powerful and very efficient access control mechanism, a base class FAC (Forwarding Access) was invented. For efficiency, FAC keeps access list entries as nodes in an AVL tree. A tree does not have a predefined size and may grow freely. Management routines are provided to allow network management to set entries and retrieve them in serial order. These routines are supported by iterator classes written to walk the AVL trees.

Efficiency is further maximized because within each access list, valid entries are also linked across the tree in their sequence order for fast scan during filtering. Each interface may associate with one and only one access list as identified by an ID in the entry. This association is done in the forwarding part of a protocol's MIB via an ID leaf and a control leaf to enable or disable filtering.

B.3.1 Base Class FAC

FAC is a base class for all protocols' access control including IP, IPX, DECnet, Appletalk and for filtering routing protocols such as RIP. Each individual protocol derives its access list class from FAC. In the protocol-specific MIBs, access control consists of a table of entries. An entry begins with four common leaves managed in FAC: ID, Sequence, Matches and Permission. The first two index the entry instance and are unique to that entry.

ID: The ID is the identifier which groups entries into a particular list. All lists reside in the same single tree for that protocol.

Sequence: The sequence number keys the order of entries in a given access list. When filtering a packet, the first matching entry exits the filter check and a packet may match multiple entries, so order is important.

Matches: This is a read-only counter of the number of times the entry has been matched during a filter( ) call since the entry was created.

Permission: This is enumerated and includes values:
  invalid (for management to remove an entry)
  permit (allow packet forwarding from source to destination)
  deny (deny packet forwarding from source to destination)
  permit bi-directional (allow packet forwarding from either source to destination or destination to source)
  deny bi-directional (deny the packet forwarding from either source to destination or destination to source)

B.3.2 Disassociation of list and interface

This allows the same list to be associated with multiple interfaces (but not necessarily all interfaces) so that fewer access list entries need be created.

B.3.3 Wild Card Addressing

Although addressing is the protocol-specific part of the access list entry, all protocol FAC derived classes support some special case address values which stand for a range of addresses. For example, in IP an address is paired with a mask and 0's in the mask are wild cards matching anything in the corresponding part of the address. Thus an address paired with a mask of all 0's matches everything. This is powerful—to filter out all packets from any source destined to a server, set the access list entry with the server's destination address and mask of all 1's, but use a source address and mask of 0's.

B.3.4 Sequence keying

This provides ease of use in specifying what to filter. For example, to allow all packets through from one subnet and deny all packets from other subnets on the same network requires only two entries. Set the first entry to permit the good subnet and the second entry to deny all subnets of that network by using a wild card for the subnet and host portion of the address.

B.3.5 Bi-directional Permission

This also allows ease of specification—one entry to stop both request and replies between two end nodes (instead of having to specify two entries—one for the request from source to destination and one for the reply from destination back to source).

B.3.6 Checking Access On Service As well As Forwarding Interface

Together with bi-directional permission, this allows ease of specification allowing the same entry to be defined for both interfaces (rather than one entry on one interface and source and destination reversed for the other entry and interface).

This also allows for discrimination based on interface, not just on address—e.g., all source A to destination B permitted on interface 1 but not on interface 2. This is not possible if filtering is only checked on the forwarding side (unless interface is made part of an entry, which is more awkward to administrate).

B.4 FRAMING

Figure 5:
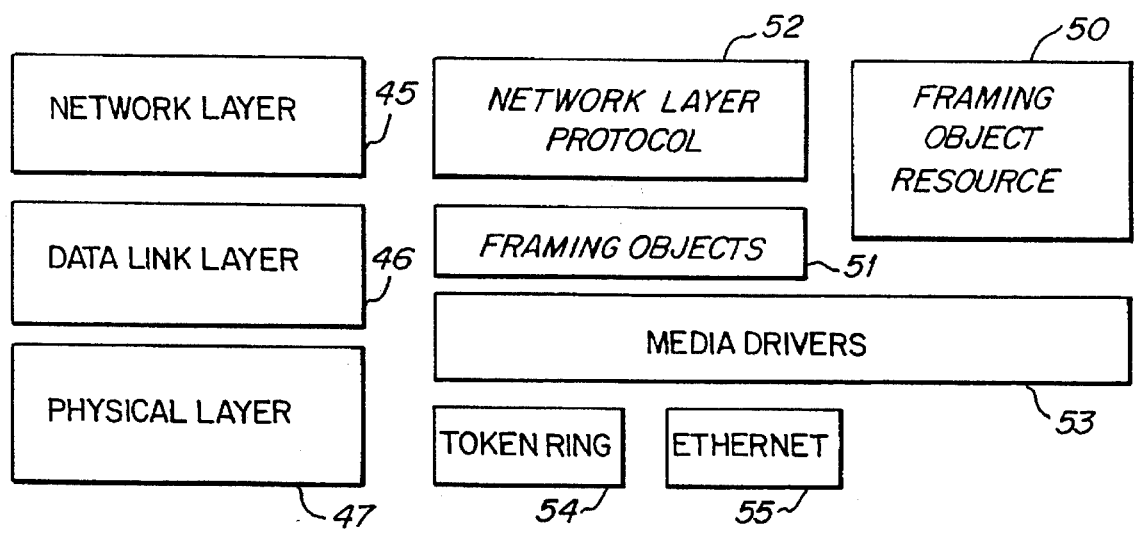
FIG. 5 is a schematic illustration of the network layer and framing object component relationships.

As shown in FIG. 5, the first three layers of the OSI reference model depict the physical 47, data link 46, and network 45 layers. Multiprotocol routers utilize this layering model to switch network layer packets between different data link and physical layer combinations, thereby allowing network layer protocols to run over a variety of communications facilities.

In accordance with this invention, Framing Objects are provided to present a common interface between standard data link and physical media configurations and network layer protocol components. FIG. 5 depicts the network layer and framing object component relationships against the OSI layer model. The Framing Object components consist of the Framing Object Resource class 50 and the specific Framing Objects 51. The Framing Object Resource class 50 assists the network layer in determining platform specific configuration information as it pertains to media and interfaces found on the system, and in the allocation of specific Framing Objects 51 to be employed by the network layer protocols 52 to receive and transmit network layer protocol data units on each network interface. Framing objects are instantiated for each type of framing a protocol framing engine supports and are bound to the interface object to which the forwarding engine is attached.

Framing Objects are realized by deriving data link and media specific Framing Objects from a base Framing Object class. The base Framing Object class provides methods: to allow the network layer protocol to register to receive network layer packets matching framing and protocol identifier criteria; to transmit network layer protocol data units; and to obtain information about the associated data link and physical layers.

Standard data link framing formats and protocol identifiers, as defined by the standards committees, such as IEEE, IETF, are realized through specific Framing Objects. Data link framing and media details are embedded in the Framing Objects to relieve the network layer from this knowledge.

Where required, methods are provided by the Framing Objects to obtain data link framing and media information in a generic manner, for example, to return the length and value of a data link physical address, obtain the length of a data link header, or obtain the media MTU.

Framing Objects are requested from the Framing Object Resource class when the network layer protocol components are instantiated over system interfaces to service and forward network layer packets (see framing object 242' in forwarding engine 234' of FIG. 3E). The network layer protocol assumes nothing about the nature of the media associated with a system interface and requests Framing Objects for each of the framing formats that are supported by the protocol. The Framing Object Resource class constructs and returns only valid framing formats as determined by the media associated with the requested interface. Framing Objects are bound to the interface and media drivers when they are constructed.

For example, FIG. 5 shows how IP network layer protocol 52 supports framing standards for operation over ethernet 55 and token ring 54 media, via media drivers 53. From a framing point of view for these media, IP supports Ethernet Version 2 and 802.2 LLC with SNAP framing. When instantiated over an interface, the IP network layer will request Framing Objects for both of these framing standards. When instantiated over an ethernet interface two Framing Objects will be allocated: an Ethernet Version 2 Framing Object and an 802.2 LLC with SNAP Framing Object; when instantiated over a token ring interface, only an 802.2 LLC with SNAP Framing Object will be allocated. The ethernet 802.2 LLC with SNAP Framing Object will be framed with the 802.3 MAC layer, while the token ring 802.2 LLC with SNAP Framing Object will be framed with the 802.5 MAC layer. Once returned, the network layer protocol can select and use any of the allocated Framing Objects to register to receive and transmit network layer packets.

Framing Object instances returned from the Framing Object Resource class can be used by the network layer protocol to simultaneously support all valid framing formats for a specific media. Dynamic teaming of network stations and associated framing formats can be achieved. For example, the IP network layer protocol may be communicating with two IP stations on a directly connected ethernet segment using Ethernet Version 2 framing for one IP station and 802.2 LLC with SNAP framing for the other. The Framing Object is retained in the ARP cache along with the MAC layer physical address to allow the IP network layer to map a framing format, as well as, a physical address to an IP station.

B.5 EVENT FUNNEL

Applications such as routing consist of multiple tasks or threads of control, are driven by events, and require a scheduling mechanism to distribute the processor effectively among the threads of control—i.e., to dynamically reschedule threads based on events asynchronous to the running thread such as the arrival of a packet on the network or the expiration of a timer. Support for this event-based rescheduling of threads is provided by the operating system.

Beyond this distribution across threads, an individual thread itself may need to divide its attention among the competing events which it services. An event funnel which allows a thread to wait on multiple events simultaneously in one place, greatly simplifies the architecture of the thread code. Applications written over major operating systems such as UNIX have such support, i.e., the select( ) system call in 4.3BSD UNIX or the poll( ) system call in System V.

B.5.1 RtrEvent and RtrSlice

Figure 6:
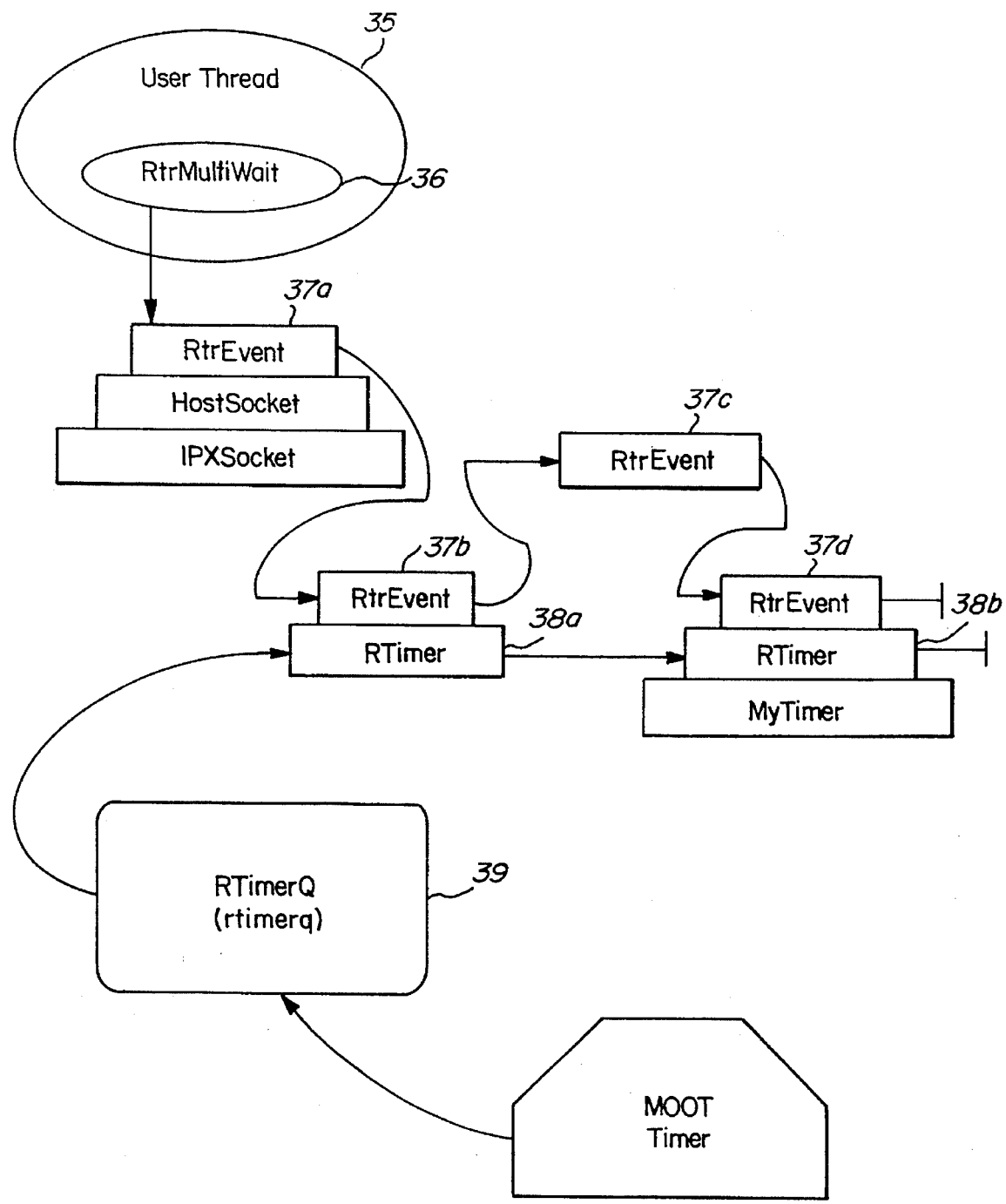
FIG. 6 is a flow diagram of a distributed routing event timer.

This invention provides for an object-oriented event funnel by organizing the abstraction of an event into a base class RtrEvent. Various event types such as packet arrival or timer expiration, may then be defined as classes derived from RtrEvent. For example, packet arrival is modeled through a socket class derived from RtrEvent— see FIG. 6.

RtrEvent has a public procedure wait( ) which blocks the thread and a procedure hit( ) which flags the operating system to reschedule the associated thread. To wake up a thread blocked waiting on a given RtrEvent, that RtrEvent must be hit by a different running thread or an interrupt service routine. A raw RtrEvent can be used for IPC (Inter-Process Communication). Each RtrEvent is assigned a unique identifier when constructed and contains a void pointer to carry user data through the event.

A thread 35 may wait directly on a single RtrEvent or associate a set of RtrEvents with an event funnel and wait collectively. The funnel is class RtrMultiWait. RtrMultiWait 36 provides an add( ) procedure to add a RtrEvent to it and keeps the RtrEvents 37a–d on a linked list. It likewise provides a remove( ) to disassociate a RtrEvent.

A thread may instance a RtrMultiWait and wait in one place on multiple RtrEvents. These may be raw RtrEvents or derived objects in any combination. RtrMultiWait itself contains its own event and has a mwait( ) procedure which blocks its thread on its event. When an associated RtrEvent is hit, that hits the RtrMultiWait as well. When control resumes in the thread returning from the mwait( ) call, the hit RtrEvent is returned.

If multiple events occur (multiple RtrEvents are hit) before the operating system scheduler runs the funnel's thread, mwait( ) presents the highest priority RtrEvent. The next mwait( ) call does not block but returns immediately with the next highest priority RtrEvent. Within the same priority, mwait( ) returns them in order of occurrence.

Actually mwait( ) does not always return immediately even though it has one or more RtrEvents in a hit state. This is because it checks before returning with another class, RtrSlice, to assure the funnel's thread has not exceeded a configurable time quantum, defaulted for example to 0.4 seconds. If exceeded, RtrSlice returns control to the operating system scheduler to reschedule the thread. Without RtrSlice, the threads are not preempted and must share the processor equitably among themselves. RtrSlice assists in this regard because it can be called freely without penalizing the calling thread. If the quantum has not been exceeded, RtrSlice does nothing but return. Since many threads are built around an mwait( ) call, a lot of the sharing problem is solved by this single use of RtrSlice.

B.5.2 RTimer

This invention further provides for efficient queuing of timers. A timer is an important type of event and is embodied by RTimer, a class derived from RtrEvent. Individual components of the communication device may further derive component specific timers from RTimer. The granularity of timers is, for example, 0.1 seconds.

RTimer's start( ) procedure inserts it on the timer queue with a given delay until expiration. When the time expires the timer queue sounds the alarm which means the RTimer's base class RtrEvent hit( ) is called. RTimer may be constructed as a one-shot timer or as a cyclic timer which is rearmed automatically on the timer queue after its alarm is sounded. A parameter "count" keeps track of how many times have passed before the timer is restarted. The period of the cyclic timer may be different from the initial alarm time.

To tick timers down efficiently and sound their alarms, class RTimerQ is provided. The embodiment shown in FIG. 6 uses a single object instance of RTimerQ 39. RTimers 38a, 38b are associated with it when started. The RTimerQ links the RTimers onto it in order of alarm time so that it only needs to look at the head of the queue to see if a timer has expired. RTimerQ runs off a single operating system primitive which ticks in a clock interrupt service routine every 0.01 seconds, for example. It checks the head of the queue and if there is work to do it hits its own event to reawaken in thread context and process the queue. Thus it hits the expired timers in a thread context (of very high priority), not in the time critical interrupt context.

Rtimer has a start( ) procedure to insert it into the RTimerQ queue as well as stop( ) to remove it. For efficiency and because thread code in this embodiment is not reentrant, RTimer also provides a startx( ) and stopx( ) to start and stop timers from interrupt service code. These routines simply put the timers on a critical path linked list and hit the event associated with RTimerQ. When RTimerQ wakes up in thread context, it unhooks the critical path linked list and inserts each RTimer into the queue in alarm-time order.

C. ROUTING PROTOCOLS

Routing Protocol Objects provide the autonomous functionality required for topology exchange protocols to function. Topology exchange protocols discover adjacencies (neighbors), advertise network reachability, synchronize their databases, and perform best-path determination. The base object classes provide a common set of services that are protocol-independent. Specific Routing Protocol derived classes automatically get the same behavior and control for any protocol. The Routing Protocol Object framework embeds (or distributes) the required objects into the Routing Protocol Object itself. In this way, the Routing Protocol is self-sufficient in that it has its own configuration, and system services, as well as its object functionality (e.g., advertise routes, apply split-horizon, update FIB, etc.). Specifically, the embedded objects are (see FIG. 3C):

Routing Protocol Thread 220'—This object gives process context under which to run the topology exchange functions.

Routing Table 223'—This object gives an AVL-tree table for maintaining the network map. This table can grow arbitrarily in size.

Neighbor List (Adjacency) 225'—This object provides a means for discovering and maintaining router adjacencies. These adjacencies are the next-hop routers and share in the topology exchange.

Network Interface Table 224'—This object provides protocol-specific configuration information for each attached network interface.

Event Object 221'—This provides its own event definition capabilities within the Routing Protocol Object. Routing Protocol threads rely on events for processing advertisements and maintaining the network maps.

Timer Object 222'—This provides its own timer derived objects within the Routing Protocol Object. Common times are defined for periodic advertisement and link-state updates.

This Routing Protocol Object provides for distance-vector protocols; however, objects for supporting link-state protocols could similarly be provided.

D. MANAGED OBJECTS

Another aspect of this invention is the use of an object-oriented system of computer code for local and remote device management. This system has the advantage of modular decomposition which simplifies the implementation of existing and future device management functionality. Specifically, it provides:

A standard interface for Managed Objects in the Management information Base which requires little if any duplication of previously written code.

A standard interface for Managed Object tables which allow the user to implement SMI tables using standard table conventions without the added overhead of assuring those conventions are met.

Provisions in the Managed Object interface to indicate an object will be non-volatile without having to write additional code to interface with non-volatile memory. These are called "Persistent Objects."

A standard interface for the Management Information Base for object access by any management protocol or other entity including SNMP, SNMPv2, DMP, local device management, and other Managed Objects.

A set of objects representing the nine basic data types defined in the SMI, which in addition to encompassing the basic properties of these types, allow for a standard method of augmenting their basic properties for additional purposes. These include the encoding and decoding of management protocol packets and the use of the types as Managed Objects themselves.

The following definitions will be used:

| | |
|---|---|
| Base Class | A class from which another class is derived (see Class, Derivation). |
| Class | A logically grouped set of data and the functions that operate on them. |
| Derivation | Without changing a class, derivation adds and/or augments this class to perform additional or different functionality. The original set of code may limit the ability or extent to which it may be augmented (see class). |
| ISO | International Standards organization. |
| Managed Object | A piece or table of data in the Management Information Base. |
| MOF | Managed Object Framework; the underlying system of communications device management. |
| MIB | Management Information Base; a database of manageable information about a device. It is described in RFC 1156. |
| Object Identifier | A series of numbers which uniquely identifies a piece or group of data in the Management Information Base. often abbreviated OID. |
| RFC | Request For Comments; a document of the Internet Engineering Taskforce (IETF) system of standards. An RFC (request for comment) is a published document which can be obtained by contacting the RFC editor at USC/Information Sciences Institute, 4676 Admiral Chief Way, Marina Del Rey, California 90292-6695, USA. |
| SMI | Structure of Management Information; a system of | information organization conventions. It is defined in RFC 1155.

Figure 7:
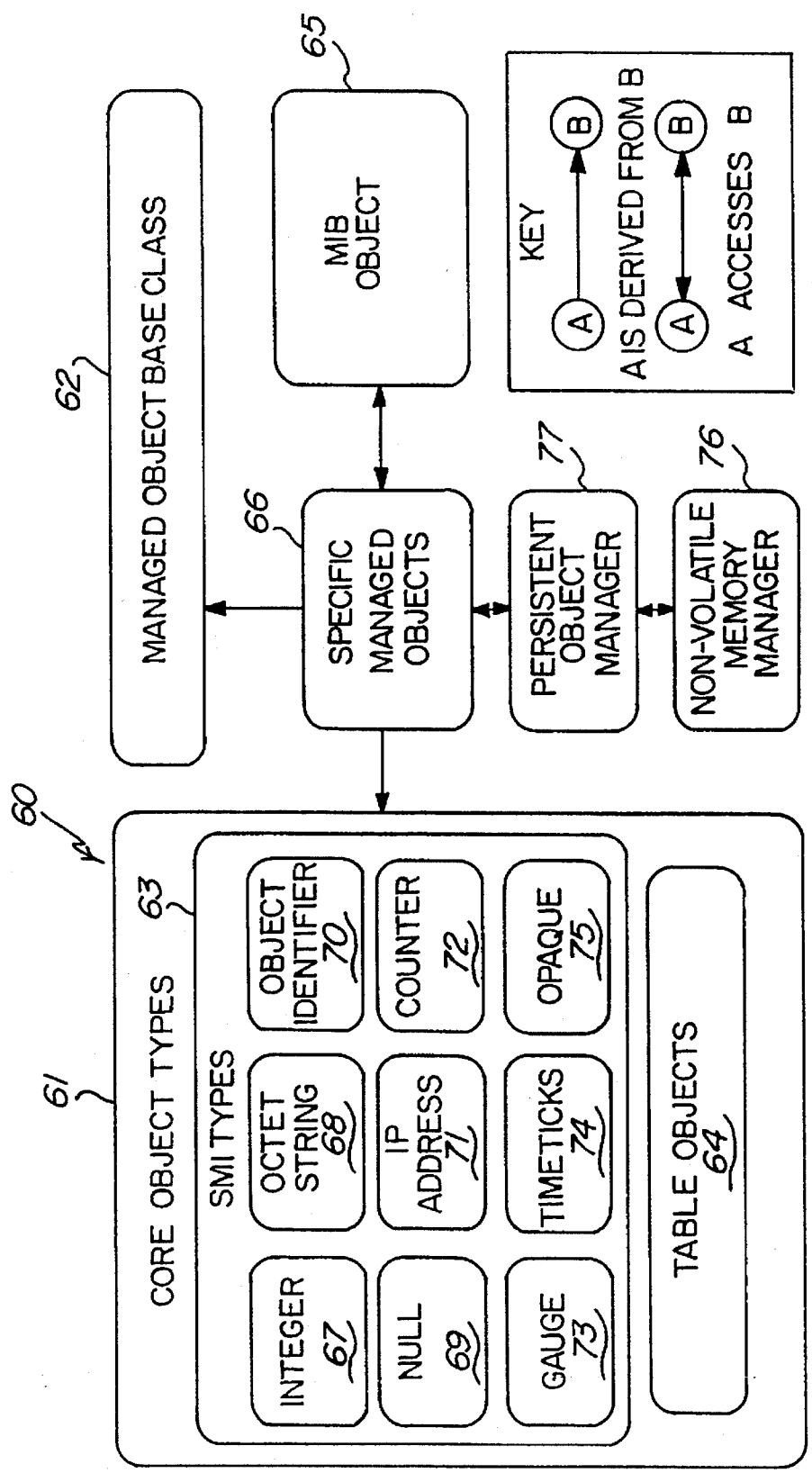
FIG. 7 is a schematic illustration of the structure of the managed object framework.

A graphical representation of the MOF is shown in FIG. 7. The MOF 60 is broken down into five separate components:

Core Objects 61, including SMI Type Objects 63 and Table Objects 64

Managed Object Base Class 62

MIB Object 65

Specific Managed Objects 66

The MIB Object 65 provides the mapping of an Object Identifier (which uniquely identifies a piece of data in the Management Information Base) with a particular Managed Object. It then takes advantage of the Managed Object Base Class standard interface to retrieve the actual data held in the Managed Object.

The Core Objects 61 represent a set of objects used by the entire MOF. These include one object for each of the nine basic types defined in the SMI: INTEGER 67, OCTET STRING 68, NULL 69, OBJECT IDENTIFIER 70, IPAddress 71, Counter 72, Gauge 73, TimeTicks 74, and Opaque 75. Each of these objects encompass the functionality and valid states described in the SMI, as well as additional functionality useful to the code which uses these types. Other Core Objects include Table Objects 64 for holding the data for Managed Object tables.

The Managed Object Base Class 62 provides a standard method of access to specific Managed Objects 66. Any object which derives from this base class need only customize a small amount of code to allow this standard access, which the MIB then takes advantage of in obtaining the object's data.

The Specific Managed Objects 66 are data types that are multiply derived from the Core Objects 61 and the Managed Object Base Class 62 to encompass the functionality of each. For instance, an Integer Managed Object contains the integer functionality derived from the INTEGER Core Object 67, as well as the manageability derived from the Managed Object Base Class 62. When a new Integer Managed Object is needed, a designer simply needs to provide the value of the integer (or information on how to obtain the value) and a unique Object Identifier. This requires relatively little new code to accomplish. The MIB Object 65 is then able to access the Managed Object in a standard way. Managed Object Tables are also created in this way. The following is an enumeration of the specific Managed Objects:

| Name | Derived From |
| --- | --- |
| Integer Managed Object | Core INTEGER, Managed Object Base Class |
| String Managed Object | Core OCTET STRING, Managed Object Base Class |
| OID Managed Object | Core OBJECT IDENTIFIER, Managed Object Base Class |
| Null Managed Object | Core NULL, Managed Object Base Class |
| IP Address Managed Object | Core IP Address, Managed Object Base Class |
| Counter Managed Object | Core Counter, Managed Object Base Class |
| Gauge Managed Object | Core Gauge, Managed Object Base Class |
| Time Ticks Managed Object | Core Time Ticks, Managed Object Base Class |
| Static Table Managed Object | Core Static Table, Managed Object Base Class |
| Dynamic Table Managed Object | Core Dynamic Table, Managed Object Base Class |

D.1 MIB Access

The MIB may be accessed in four ways: Get, Get-Next, Set, Set-Validate. A Get operation requires a complete Object Identifier. The MIB will map the Object Identifier to a Managed Object (if one exists with that Identifier) and call that object's Get command to retrieve the information. An error is returned if the Managed Object with that identifier does not exist. A Get-Next operation may take a non-existent, complete, or partial Object identifier and will map it to the next numerically highest complete Object Identifier that exists in the MIB. Again, the MIB will then call that object's Get command. An error will be returned if there is no Managed Object numerically higher than the one specified. A Set or Set-Validation operation requires a complete Object Identifier, type and value. They will map the Identifier the same way a Get operation does. In a Set operation, the Managed Object will be set if it is "writable," the type is correct and the value provided is valid for that Object. The Set-Validation operation makes the same checks as the Set, but does not actually change the value of the Managed Object. An error is returned if a Managed Object with that identifier does not exist, the type is incorrect, or the value is incorrect or out of range.

The MIB also provides an authentication service. An authorization information object is sent with each MIB access command. Once the MIB has confirmed a Managed Object exists for a particular Object Identifier, the device's authentication manager is sent the Object Identifier along with the authentication information object. The authentication manager is application specific to allow any device to specify its method of authentication.

The Managed Object may be accessed by the Get command and, if the object is writable, by the Set and Set-Validate commands. In implementing a specific Managed Object, one must specify if the object is read-only or read-write, the user must provide methods to check the type, to check the value, and to set the value of the object. This is the minimum of functionality one must provide for a Managed Object. Additional functionality includes specifying (on a Set command) that a new value should be stored in non-volatile memory and retrieved at the beginning of device execution. This is specified upon return from a Set command.

When the Managed Object Base Class receives a request to store a value to non-volatile storage, it calls a device non-volatile memory manager with the Object Identifier, type and value (see FIG. 9 and section D.3 below). At the beginning of device execution, all Managed Object values are restored through calls to the MIB as if Set commands were called for those objects.

Managed Object Tables interact with the Core Table Objects to provide ordered sets of information. Each value in each entry of the table may be considered the value of a managed object for a particular table index. The index is extracted from the Object Identifier (in a manner specified in the specific Managed Object), the Core Table Object is asked to look up an entry with this key, and the value is extracted and returned from the entry. The Set command works the same way, except the entry index Managed Object Tables may also specify that they should be saved to non-volatile memory after a Set command. In contrast to the non-tabular objects, entire table entries are restored at the beginning of device execution using the Core Table Object's add command.

A second type of Managed Object Table allows table entries to be added and deleted. This is accomplished through the convention of specifying one indexed Managed Object as an entry control. Setting this entry control object to different values allows the entry to be added or removed from the Core Table Object. The saving of entries of this kind to non-volatile memory works the same as the table object described above, with the addition of allowing entries to be removed from non-volatile memory when the entry is removed from the Core Table Object.

As may be surmised from the table of specific Managed Objects above, both static and dynamic tables are available in the Core Objects, depending on the memory model used. It is also useful to note that additional Core Objects may be added to provide additional functionality to both tabular and non-tabular Managed Objects as necessary.

Figure 8:
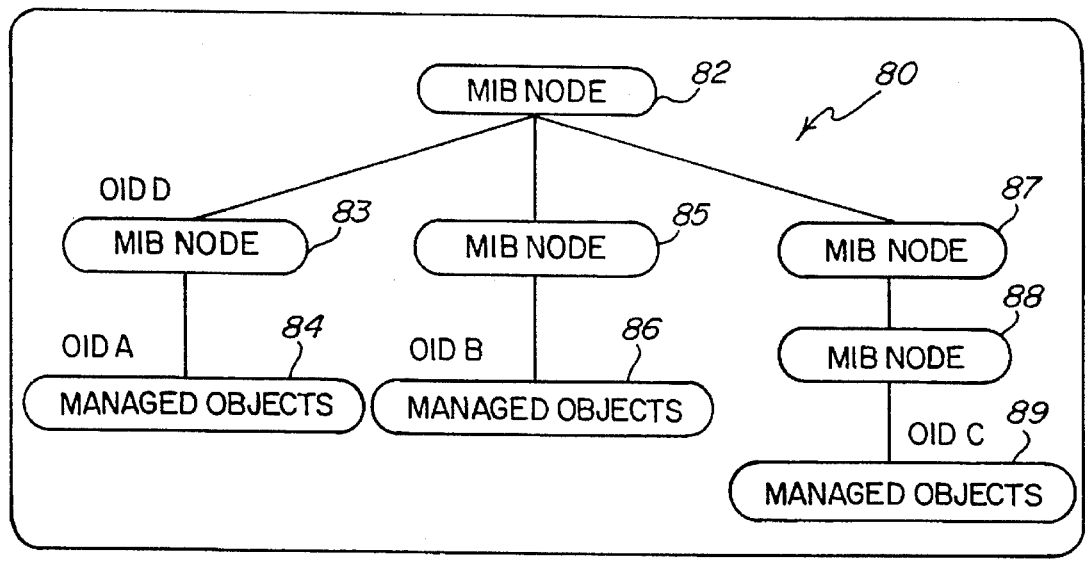
FIG. 8 is a schematic illustration of the structure of the managed object MIB tree.

As shown in FIG. 8, the MIB is structured as a tree 80 of MIB nodes 82–89, with each node representing an identifier in the Object Identifier (OID). Managed Objects 84, 86, 89 are placed at the leaf nodes. If one wishes to access the MIB to Get the Managed Object named by "OID A", "OID A" would have to be specified exactly. A Get-Next on "OID D" would also get the information for "OID A", because a Get-Next will return the next Managed Object leaf after the OID specified. If one does a Get-Next on the Managed Object named by "OID A", the information would be returned from the Managed Object specified by "OID B," and so on. One should also note that before the MIB asks the leaf Managed Object for its information, an access authentication is made. If the access for the operation is invalid, a Get, Set, or Set-Validate will return a non-existent OID error, while a Get-Next will move past a leaf Managed Object to the next in the tree.

---

D.2 Internals
The Managed Object Base Class provides the following interface (in C++ code):
```
Class ManagedObject    {
    //Functions used by MIB for common Managed
    //Object access at leaf:
    Get();
    GETNEXT();
    SET();
    SETVALIDATE();
    //Functions which specific Managed Objects
    //provide to the functions above to return its
    //specific information:
    mo_get();
    get_instance();
    mo_set();
    set_validate();
    get_status();
};
```

The GET, GETNEXT, SET, and SETVALIDATE are the functions representing the access methods described above. The mo_get function is called by the GET and GETNEXT access functions to return the information for a specific leaf in the MIB tree. The get_instance functions validates the Object Identifier for the GET and GETNEXT functions. If more than one MIB leaf is represented by this Managed Object, get_instance will also update the Object Identifier to represent the "next" leaf when called by GETNEXT. The mo_set function is called by SET to store new information for a particular leaf and depending on the return value save new information to non-volatile storage. The set validate function is called by both SETVALIDATE and SET to validate the value's Object Identifier, type and value. The get_status is called by both SETVALIDATE and SET To assure the Managed Object is not read-only. Each specific Managed Object provides the routines necessary for its particular leaves and read-write status. These five standard routines allow the implementation of specific Managed Objects to be flexible, while keeping operations common to all Managed Objects in the common GET, GETNEXT, SET, and SETVALIDATE routines. A Managed Object may represent many leaves of many types and values, while requiring only a few lines of code for more simple Managed Objects.

D.3 Persistence

As mentioned above, the SET will call a specific Managed Object's mo_set function and, depending on the return value, save it to non-volatile memory. The SET function interacts with a system called the Persistent Object Manager.

Figure 9:
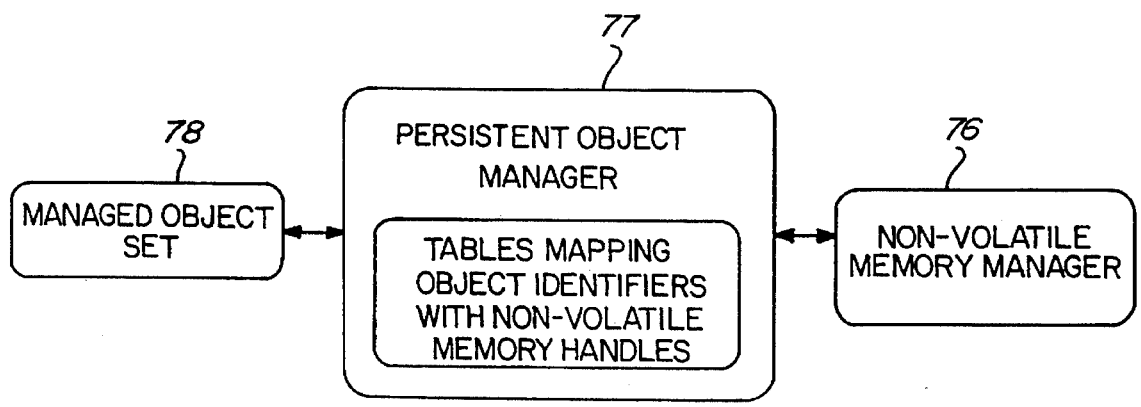
FIG. 9 is a flow diagram illustrating the storage of persistent objects in non-volatile memory.

As illustrated in FIG. 9, when a device begins operation a Persistent Object Manager 77 is created and interacts with a Non-Volatile Memory Manager 76 to build a table mapping Object Identifiers with "handles" for retrieval and storage of Persistent Objects. Each specific Managed Object which is persistent is then created and calls the Persistent Object Manager to restore its values through the standard Managed Object Base Class. When a Persistent Object is set to a new value, the Managed Object SET function 78 will call the Persistent Object Manager 77 to store the value. If the object has been stored previously, the Persistent Object Manager will use its established "handle" to update the non-volatile value. If an object has not been stored previously, the Persistent Object Manager 77 asks the Non-Volatile Memory Manager 76 for a new handle (identified by the object's Object Identifier).

D.4 NVRAM File System

The NVRAM File System overlays a simple file system structure over the Non-Volatile Storage. The file system allows tagging of blocks by object identifiers. This allows every object to automatically fit into the file system hierachy since every object, by definition, has a different object identifier assigned out of the global MIB naming tree.

E. COMMON MIB TEMPLATE

The MIBs provide the ability to configure, monitor, and control routing applications at both the system level and the network interface level. The system level provides control at the device level where global parameters for the applications or services can be set. The network interface level provides control where the applications or services attach to the network. This is key for network specific parameters that may vary from network to network. The MIBs use default parameters as much as possible to allow the minimum amount of user configuration before the device is operational.

E.1 ctRouter-MIB

Routing Services provides the ability to "discover" which routing applications and components are in a device. Since devices support a variety of network services and applications, it is essential for management applications and network users to be able to determine the particular capabilities of any device. Any device providing Routing Services will contain an entry in its Chassis MIB showing the availability and version of the Routing Services. This is basically a "table of contents" for what applications are in the device, with only one entry for Routing Services. The entry specifies a high-level router MIB ("ctRouter") used to control the entire Routing Services regardless of which routers are actually in the device. The ctRouter MIB provides the ability to determine the administrative and operational status (including uptime) for any router and component without having to use any of the individual router MIBs. However, for any specific protocol or configuration control, the individual router MIBs must be used.

Figure 10:
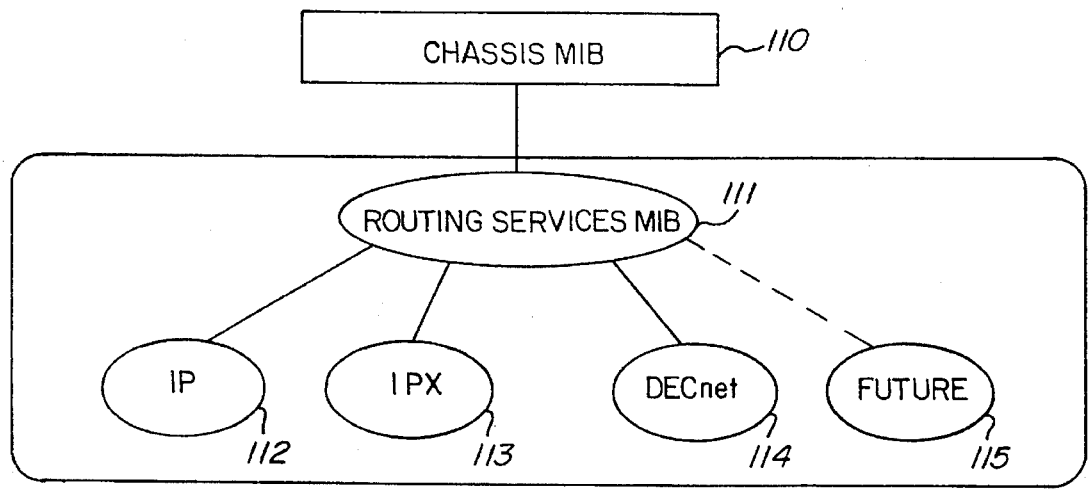
FIG. 10 is a schematic illustration of the basic management model.

FIG. 10 illustrates the basic management model, with chassis MIB 110 above the ctRouter MIB 111, and each of the individual routing protocol MIBs 112–115 below.

E. 2 The Common MIB Template

In order to provide consistent management and control of any router application within Routing Services, each MIB uses a common MIB template. Each individual router MIB is defined with the same set of managed objects. This provides a consistent external view of each individual router application. Because of the common object model, some managed objects may not have any meaning or direct application in a particular router protocol configuration. In instances where this occurs, the object is completely visible and manageable, but has no effect on the operational behavior of the router or the particular protocol.

Figure 11:
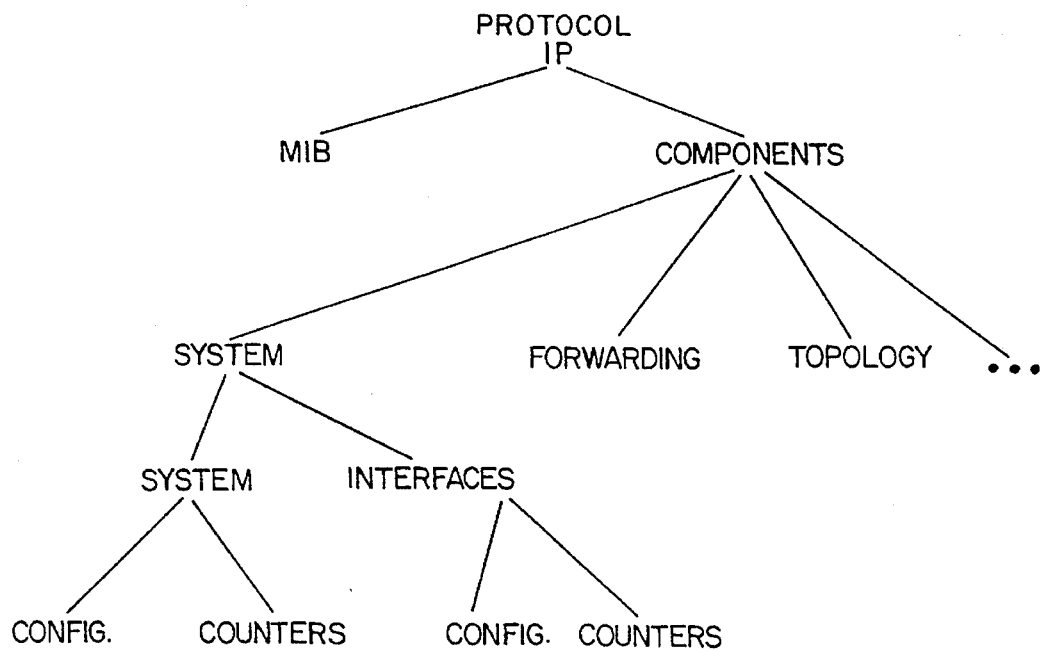
FIG. 11 is a general illustration of the common MIB template for routing services.

FIG. 11 illustrates the functional groups common to all of the individual router MIBs. The "root" protocol defines the network protocol router that is being managed, e.g., IP. "MIB" defines the version of the router MIB. "Components" defines the set of component groups that comprise a router group, i.e.,:

Router System Group—contains the objects that pertain to routing services at a global, device-wide level.

Forwarding Group—contains the managed objects used to setup and configure the network protocol's router ports for packet forwarding as well as the aggregate and per interface IP packet forwarding counters.

Topology Group—contains the managed objects for the routing and service advertisements of the router. These managed objects allow for routing agents and service agents to be controlled and monitored on a system wide as well as a router port basis. DistantVectored and LinkState are the types of topology groups defined.

Forwarding Information Base (FIB) Group—contains the managed objects for the forwarding table. This table is built from entries in the network protocol's routing table(s) and reflects the routes that are considered the best routes for forwarding.

End Systems Group—contains the managed objects which control the Address Resolution Protocol (ARP) which maps host addresses to physical addresses for each router port.

Access Control Group—contains the managed objects that pertain to establishing Access Control Lists for the network protocol's traffic.

Filters Group—contains managed objects that pertain to the setup and configuration of filters.

Redirector Group—contains managed objects pertaining to the setup and configuration of specific redirection of the network protocol's traffic.

Event Group—contains the managed objects pertaining to event logging.

Work-Group Group—contains managed objects pertaining to work-group routing. E.3 Component MIB Groups Many of the component groups throughout the common MIB template share a similar structure. The component MIB view varies depending on the actual component being managed. Each part (branch) has a common management view as shown in Table 1.

TABLE 1

Common Component MIB View Template

Component Group (a)
    System (1)
        Config (1)
        Aggregate Counters (2)
    Interfaces (2)
        Config (1)
            Config Interface Table (1)
        Counters (2)
            Counters Interface Table (1)

System Common System Config View

Objects in the Common System Configuration globally control the component.

AdminStatus(1)—controls whether this component is enabled or disabled.

OperationalStatus(2)—shows the operational status of the component.

AdminReset(3)—resets the component.

OperationalTime(4)—indicates the amount of time that the component has been in its current operational state.

Version(5)—displays the firmware version of this component.

Common System Aggregate Counters

Common System Aggregate Counters show the total byte and packet counts on all router ports of packets received, sent, discarded, and filtered. Some of the groups have additional counters. All system counters groups have the ability to enable/disable the counters on all ports and to reset counters to zero.

Interfaces Common Config Interface Tables

All interface configuration tables are initialized with default entries that match the number of MIB-II interfaces on the device. The beginning leaves of any interface table have the following form:

IfIndex(1)—MIB-II interface or port number.

AdminStatus(2)—controls whether the interface of this component is enabled or disabled.

OperationalStatus(3)—shows the actual status of this component's interface.

OperationalTime(4)—indicates the amount of time that this component's interface has been in the current operational state.

Some component groups have additional configuration leaves.

Common Counters Interface Tables

Objects in the Common Counters Interface Table show the total byte and packet counts on a router port of packets received, sent, discarded, and filtered. Some of the groups have additional counters. All interface counters groups have the ability per port to enable/disable the counters and to reset counters to zero.

E.4 Common Forwarding Group MIB

The common forwarding group MIB follows the common component view with the exception of an Address Table (see Table 2). If necessary, each protocol specifically defines an address table. For example, DECnet does not require configuring an address per port and so the address table group is not present.

TABLE 2

The Forwarding Component Group

```
System (1)
    Aggregate Counters (1)
Interfaces (2)
    Config (1)
        Config Interface Table (1)
        Address Table (2)
    Counters (2)
        Counters Interface Table (1)
```

System Aggregate Counters

The Aggregate Counters and Counters Interface Table for the forwarding group follows the structure of the basic counters groups with the addition of host in/out, error, and number forwarded counters.

Interfaces Config Interface Table

The Config Interface Table for the forwarding group follows the basic structure of all other interface tables with the following added leaves.

Control(5)—Add/DeleTe entry.

MTU(6)—determines size of packet to be sent.

Forwarding(7)—Enable/Disable forwarding of packets.

FramingType(8)—Identifies the type of framing to be used.

AclId(9)—Assigns the ACL List ID to be used.

AclStatus(10)—Enable/Disable Access control.

Cachecontrol(11)—Enable/Disable Caching.

CacheEntries(12)—Current number of entries in the cache table.

CacheHits(12)—Number of cache hits.

CacheMisses(13)—Number of cache misses.

Counters Interface Table

The Aggregate Counters and Counters Interface Table for the forwarding group follows the structure of the basic counters groups with the addition of host in/out, error, and number forwarded counters.

E.5 Common Topology Group MIB

The common topology group MIB follows generally the common component view, as shown in Table 3.

Table 3: Topologyy Component Group(4)

DistantVectored (1) or LinkState (2)
   System (1)
      Config (1)
      Aggregate Counters (2)
   Interfaces (2)
      Config (1)
         Config Interface Table (1)
      Counters (2)
         Counters Interface Table (1)

System System Config

The System Config branch for the topology, DistantVectored group maintains the common system config view with the following added leaves:

Stacksize (6)—controls the amount of stack required for the routing protocol agent.

Thread Priority (7)—specifies the run-time execution priority of this routing protocol agent.

Threshold (8)—Specifies the number of RIP entries that can be held in the routing protocol's route table.

AgeOut (9)—Specifies the time inactive routes remaining in the routing table.

HoldDown (10)—Specifies the additional time to hold an inactive route in the route table.

Interface Config Interface Table

The Config Interface Table for the topology, Distant Vectored group follows the basic structure of the common config interface tables with the following added leaves.

Version (5)—Protocol revision level.

Advertisements (6)—Periodic rate for sending routing Advertisement Updates.

FloodDelay (7)—Router discovery change delay.

RequestDelay (8)—Delay time to send response after receiving request.

Priority (9)—Priority of protocol on this interface.

HelloTimer (10)—Periodic rate for sending hello message.

SplitHorizon (11)—Enable/Disable Split Horizon.

PoisonReverse (12)—Enable/Disable Poison Reverse.

Snooping (13)—Enable/Disable Snooping.

Type (14)—Type of media access.

XmitCost (15)—Transmit Cost.

AclId (16)—Assigns the ACL List ID to be used.

AclStatus (17)—Enable/Disable Access control.

Counters Interface Table

The Counters Interface Table for the topology group follows the structure of the common counters groups with the addition of host in/out, error, and number forwarded counters.

F. COMMON BASE ROUTER RESOURCE

This section describes the consistent manner in which resources within the router services are managed. The intention of the common resource model allows for easy implementation of routing protcols and provides a scalable and portable implementation of the routing services.

Figure 12:
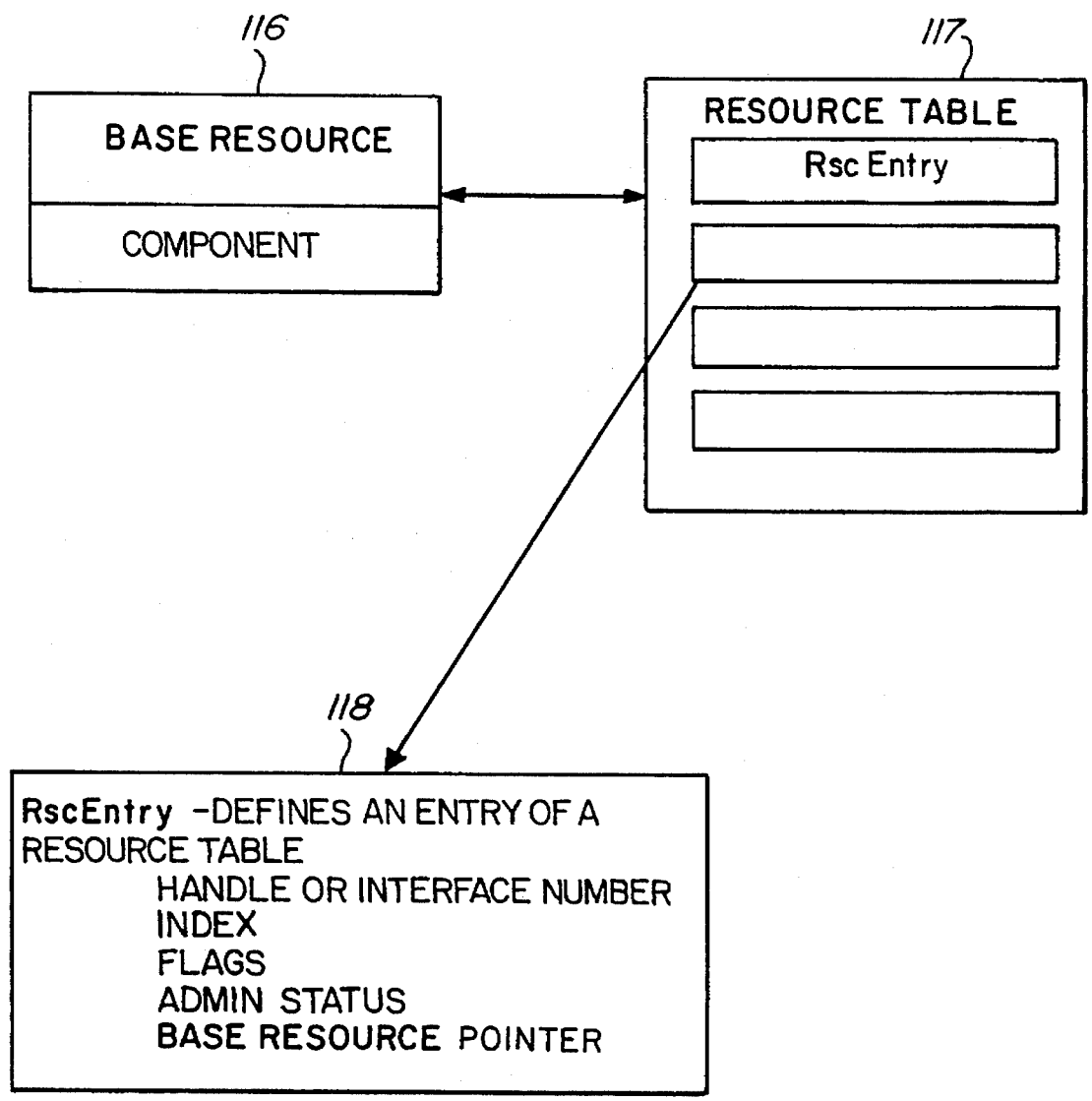
FIG. 12 is a schematic illustration of the relationships between the base resource, resource table, and resource entry.

In order to understand the common functional and MIB template for router services, a few basic concepts must be explained. These concepts are illustrated in FIG. 12. A BaseResource 116 is the most basic component of a router resource. It is a base class object that has built-in management functions and states. The common MIB router template is a collection of BaseResource components laid out in a consistent and formal manner. A ResourceTable 117 is a MIB manageable table of BaseResource objects. Each BaseResource object represents a service, component, or interface object. Almost all BaseResources are registered into one of these tables for management purposes. A RscEntry 118 defines an entry of the ResourceTable, e.g., handle or interface number, index, flags, admin status, BaseResource pointer.

F.1 BaseResource Description

BaseResource is the fundamental building block of the common router object model. It is responsible for maintaining the basic administrative and operational states of the component. Any BaseResource components that were instantiated by this component are handled appropriately if these states change. That is, if the administrative state changes from enabled to disabled, the component will deactivate and all BaseResource components that were created by this resource are deactivated as well. This allows management to be done at any level and trickle down to the lowest resource. Not all resources are manageable through a MIB. The actual manageability of this resource may be defined within the common MIB template. State changes can also occur from internal events or indirectly when a parent resource state has changed.

A BaseResource is a class object in which most router components are derived. It is comprised of these attributes, as illustrated in FIG. 13:

Class of Resource:

| | |
|---|---|
| Root Class 119 | A resource that has no parent and registers with no particular resource table. A starting point for the entire resource tree. |
| Service Class 120 | A resource that provides a system wide service like Host-Delivery or a network protocol like IP and IPX. These resources register with a service resource table and are children to some root resource. Network services have a combined MIB template defined. |
| Component Class 121 | A resource that is a component of a service resource and registers into a component resource table. Most Component class resources within the router have a common MIB template defined. |
| Interface Class 122 | A resource that is created on each interface that the device has. For each MIB-II interface defined in the router device, an interface resource exists for this component. This resource registers into an interface resource table. |

Figure 13:
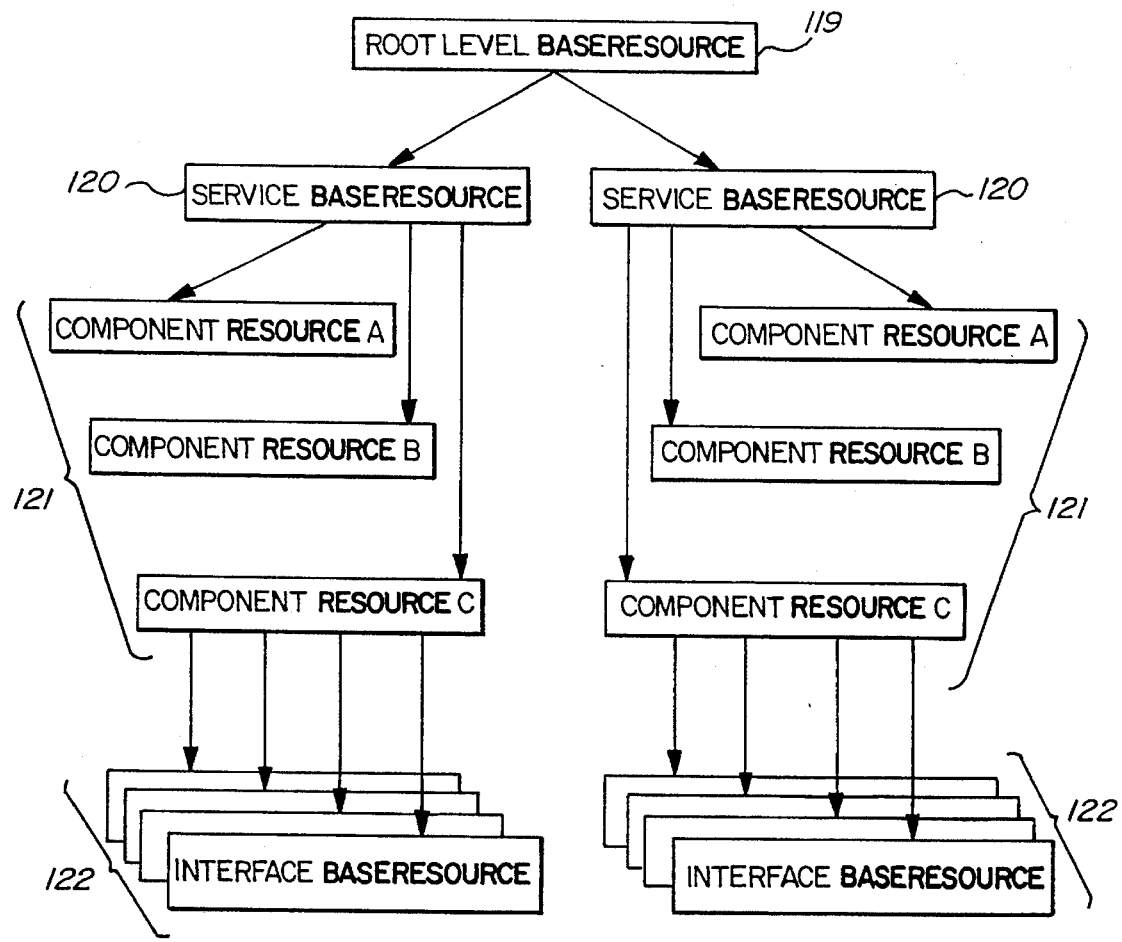
FIG. 13 is a schematic illustration of the base resource class hierarchy.
Figure 14:
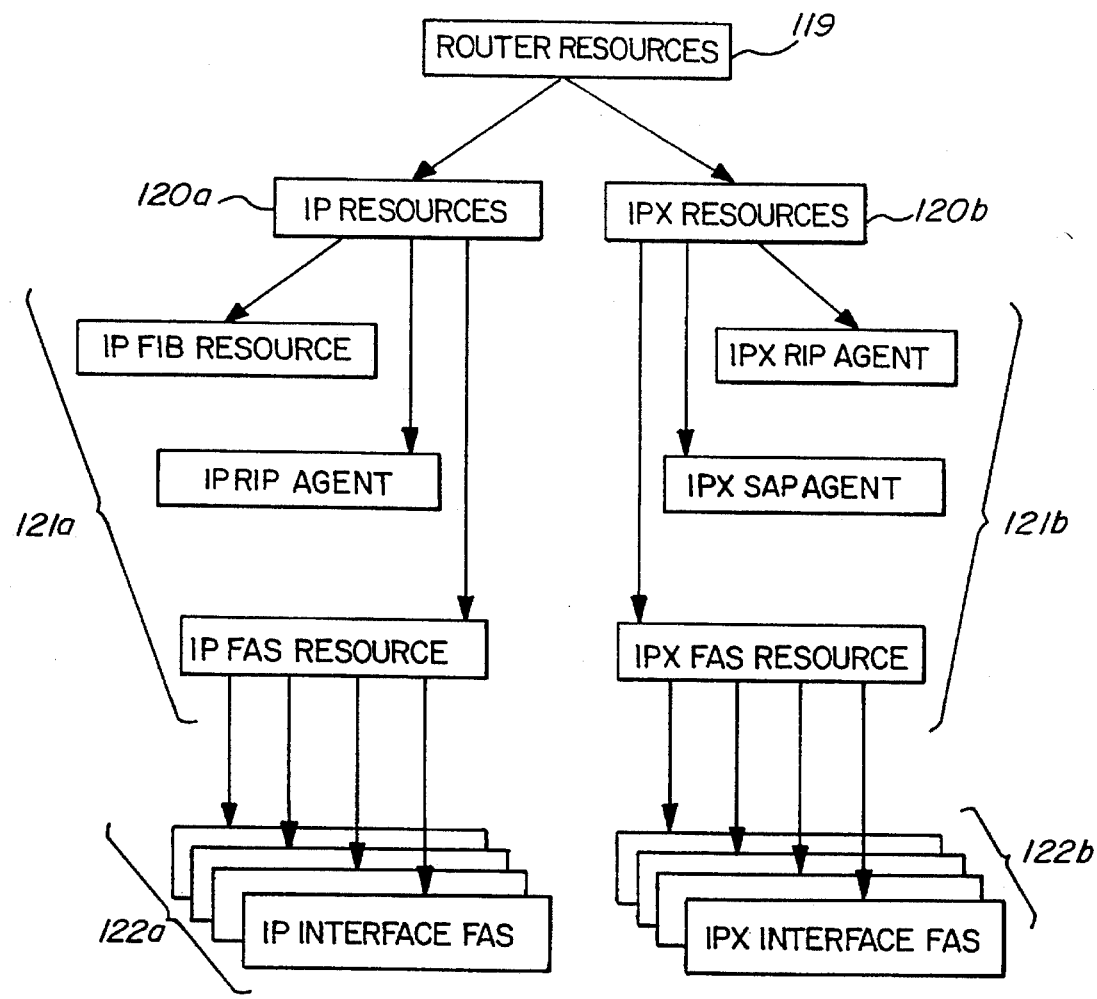
FIG. 14 is an example of a base resource class hierarchy.

An example of a BaseResource Hierarchy for IP and IPX protocols is illustrated in FIG. 14; the resource objects are numbered in a similar manner as in FIG. 13 with the suffix "a" for IP Resources, and "b" for IPX Resources.

F.2 BaseResource Functional States Administrative Status
enum: (1) Other, (2) Enabled, (3) Disabled This item is initialized to some default status during construction of resource and if a MIB template exists, can be changed by management.

Operational Status
enum: (1) Other, (2) Enabled, (3) Disabled,
(4) Pending Enabled, (5) Pending Disabled,
(6) Invalid Config This item reflects the current operational status of the resource. This is the result of a management change to admin status or some other internal event that may have occurred.

F.3 State Changes

When a root class changes state, it causes major ramifications. The underlying service, component, and interface resources must change as well. When an Interface class changes state, in most cases it only affects the interface object of that component. There are some cases when a component or interface resource must cooperate with other resources when the state changes. This is handled through configuration events. When any BaseResource changes state, the Operational-Time is reset for this resource.

F.4 BaseResource ResourceTable and Parent Resource Pointers and Handles

BaseResource components contain pointers to their parent resource and to their respective component table and interface table (if they have one). By using these pointers, resources can retrieve useful information from the parent and sibling resources as well as control the interface resources from the interface resource table. Also maintained is the component handle number. As BaseResources instantiates other BaseResources, this handle is incremented and retrieved and as the children BaseResources register into their appropriate resource table, the parent's current handle number is used as the handle id or component index.

F.5 Type of Resource

Null Type has no particular identity and does not register in a table.

Network Protocol Type is a routable protocol like IP, IPX, and DECnet. This type has a common MIB template defined.

Config Type addressing component resource, consists of the protocol's network address table or system wide network address.

FIB Type—This resource is a forwarding information base. Most network protocols have them and are used by the forwarding engines to lookup the next hop interface of of a given network address. Routing protocols use the FIB to deposit their best next hop interface of a given network address. These addresses are learned dynamically through protocols. There is no common MIB template for this type.

FAS Type—This resource is forwarding engine (service and forward). A protocol creates a FAS object for each interface it is configured on. A FAS receives a packet from an interface, validates its contents, then calls the FIB to resolve the next hop interface to send it out on. FAS objects that are of class Interface are created and managed by a parent also of type FAS. This type has a common MIB template defined.

ARP Type—This is an ARP resource (ARP=Addressing Resolution Protocol). This resource is of class Interface and Component resource. ARP is used to resolve the physical interface address of a given network address. This type has a common MIB template defined.

Routing Protocol Type—The routing protocol resource is a resource that runs in thread context. It takes on routing protocol attributes defined in the routing protocol, the distant vectored, and link state base classes. They contain an interface table of routing protocol objects of the same type as well as a topology database, and counters.

System Wide Type—This resource is on a system wide level. They are BaseResources because they need to be activated and deactivated.

Component Specific Type—This resource type is used if BaseResource can not generalize well enough. This can be used until a suitable general resource type is invented.

F.6 Other Resource Information

The following information is useful for Root, Service, and Component class resources. These resource items are needed when management needs to get this information for the common MIB template.

Operational Time—Maintains the time that the resource has been in its current operational status.

Version Number—Current Version number of service or component class resource.

Resource Name—A resource can Name its service or component.

Enterprise MIB Id—Object Identifier for this service or component class resource is passed as a parameter at construction even if there is no MIB template defined. The resource can then append additional ids where required.

Naming Tree Identifier—Naming Tree Object Identifier for this service or component class resource.

F.7 Access Functions

Once a BaseResource pointer is located, all information described above is accessible for management through public methods.

The main access functions of a BaseResource are called by the parent BaseResource. These functions are:

Construction: A BaseResource is constructed with a MIB enterprise id, default admin status, class of resource, type of resource, and pointer to the its parent BaseResource.

Initialization: This is a startup function which allows post construction initialization to occur.

Activation: This is called when a component's admin status is as enabled through management and also at startup time if the component is defaulted to enabled. The startup time activation allows the resource to perform resource activation after all other resources have been created in the device. When activation occurs, the resource first allows its own activation, then it propagates the activation to child BaseResources by performing a TableActivate on all resource tables that it contains.

Deactivation: This is called when a component's admin status is disabled through management or via some internal event. When deactivation occurs, the resource first allows its own deactivation, then it propagates the deactivation to child BaseResources by performing a TableDeactivate on all resource tables that it contains.

Reconfiguration: This is called when an internal resource event occurred within the root, service or component level. When reconfiguration occurs, the resource first allows the resource to reconfigure, then it performs a reconfiguration on all resource that it contains.

Destruction: This is called when the resource object is destroyed during a reinitialization phase.

F.8 BaseResource—Resource Table Relationship

Figure 15:
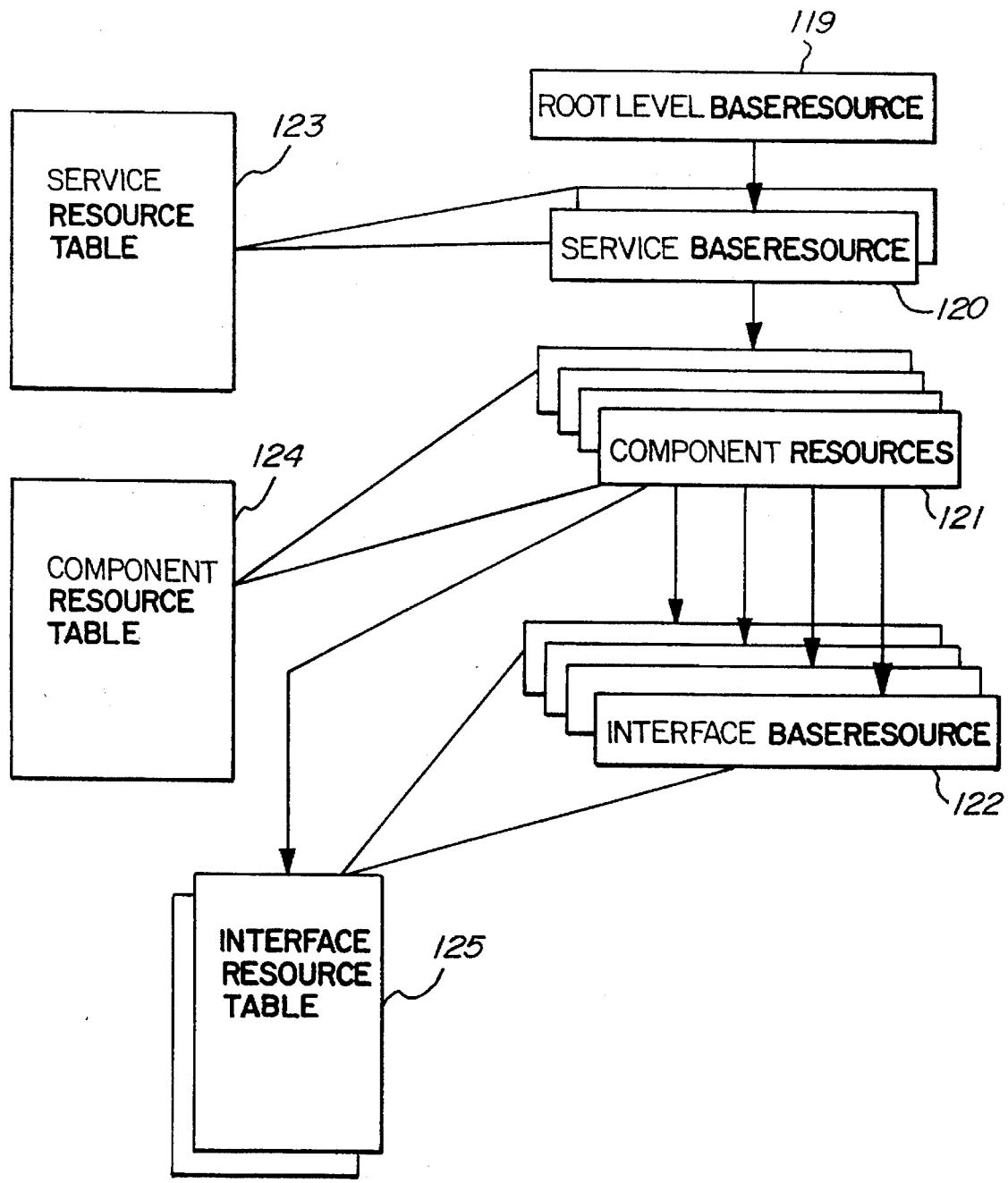
FIG. 15 is a schematic illustration of the registration in tables at the service, component and interface levels of the base resource.

The relationships between the various levels of the BaseResource and the Resource Tables are illustrated in FIG. 15.

Service Resource Table 123 is a manageable, read-only table under the ctRouter-MIB. As service BaseResources 120 are created, they register their resource pointer and handle id with their proper service ResourceTable.

Component Resource Table 124 is a manageable, read-only table under the ctRouter-MIB. As Component BaseResources 121 are created by their parent Service resource, they register their resource pointer, handle id, and component index with their proper component ResourceTable, and also with the interface ResourceTable.

Interface Resource Table 125 is a manageable table under the Service's MIB. As interface BaseResources 122 are created, they register their resource pointer and interface number into their parent's component Interface ResourceTable. Service and Component ResourceTables are tables that are created by the Root level BaseResource, Interface Resource Tables are created by component resources when needed.

F.9 Resource Table Description

The ResourceTable serves two purposes: (1) it provides an ordered list of BaseResources of the same classes so that they can be initialized, activated, deactivated, reconfigured, and destroyed in a consistent manner; and (2) they are manageable either by the ctRouter-MIB for Component and Service type tables and by the network protocol MIB for interface tables.

F.10 Class of Resource Tables

Service Class—either a network protocol table or system services table instanced by a handle id assigned by a root level BaseResource. This instance is used as a handle for the protocol's component resources. This table is defined as a read-only MIB.

Component Class—a component resource table, under a service, instanced by the parent's service handle id and a component index. The index is the handle id of the component resource assigned by the service resource. This table is defined as a read-only MIB.

Interface Class—an interface table instanced by logical interface number as defined by MIB-II. One RscEntry is created per interface and added to the table. The table size equals the number of interfaces on the device. This table is a MIB manageable and defined in the protocols service MIB. New entries to this cannot be added through the MIB. The interface table entries can be extended to manage additional parameters that are specific to the type of resource. The common MIB template defines those interface tables and their additional leaves.

F.11 ResourceTable Entry Definition

RscEntry—defines a basic entry of a ResourceTable, e.g., handle or interface number index flags admin status BaseResource pointer If the table is an interface table, then additional fields are appended.

F.12 ctRouter High-Level MIB and Router Resource Component Relationships

Figure 16:
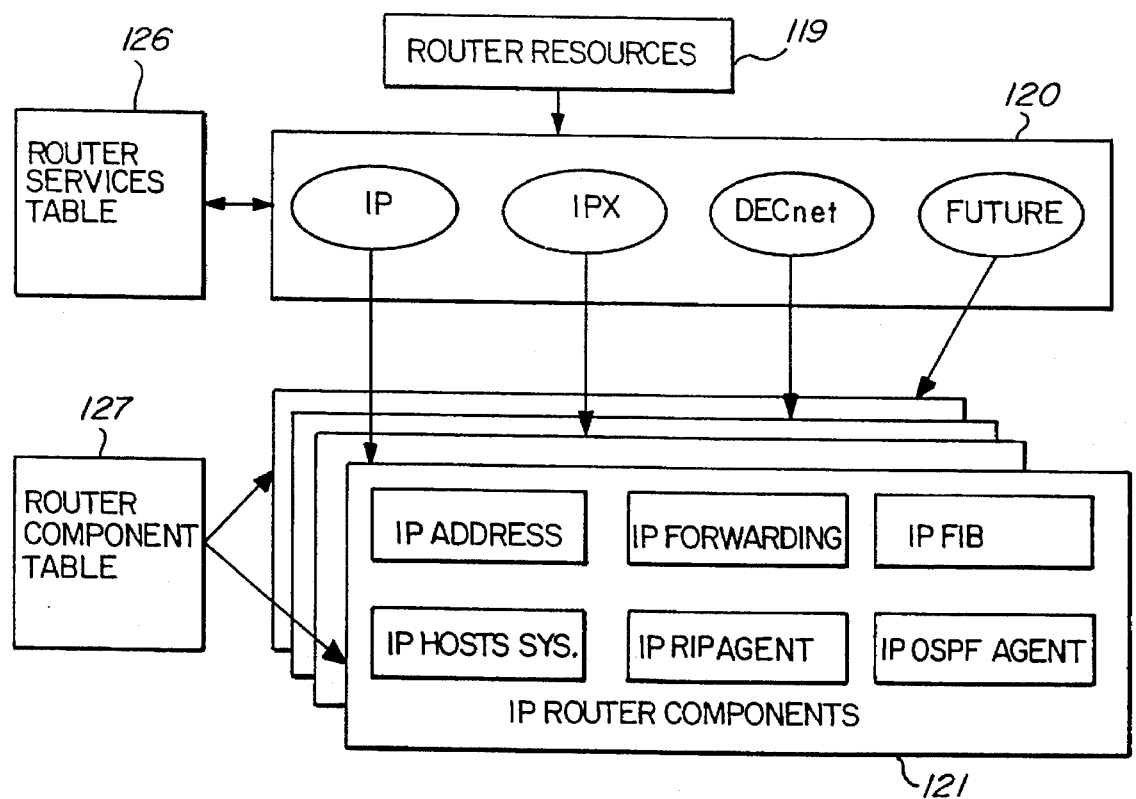
FIG. 16 is a schematic illustration showing an example of instances of router services and instances of router components.

The relationship between the ctRouter High-Level MIB and Router Resource Components is illustrated in FIG. 16.

Router Services Table 126 is a read-only ResourceTable under the ctRouter MIB. As network protocol services like IP, IPX and DECnet are created, they register their resource pointer and handle id into this table.

Router Component Resource Table 127 is a manageable, read-only table under the ctRouter-MIB. As Component BaseResources are created by their parent Service resource, they register their resource pointer, service handle id, and component handle id with the Router Component ResourceTable.

F.13 Router Templates

Figure 17:
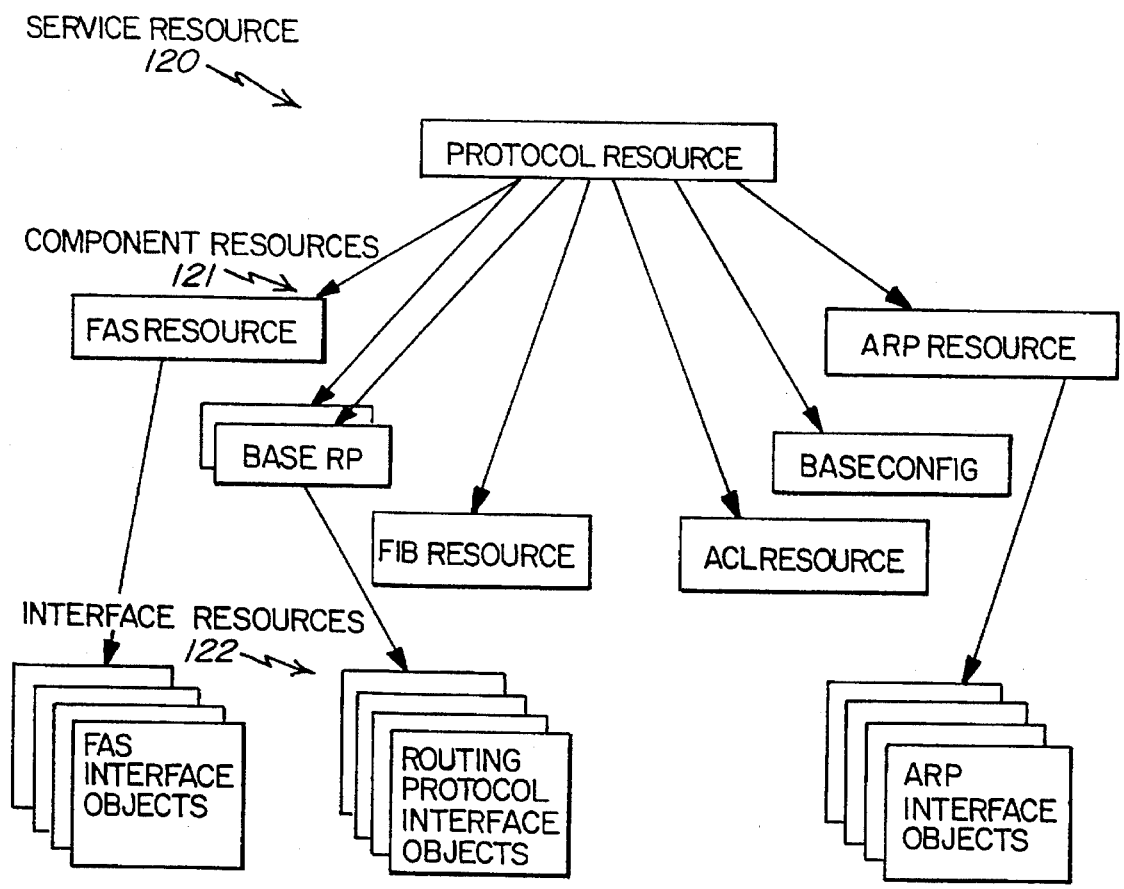
FIG. 17 is a schematic illustration of the router resource hierarchy of services, components, and interfaces.

The router template defines a base framework for any router protocol. Essentially the router template is comprised of a set of functional models that network protcols follow to implement their protocol. Each template defines a functional implementation and common MIB template as well. All templates illustrated in FIG. 17 and described below are object-oriented C++ classes that are derived from BaseResource.

Network Protocol Template Class

ProtocolResource is a base class that defines the functional implementation of a network protocol. This Resource coordinates the creation of the component template classes in an orderly way and implements a System Admin MIB so that the network protocol can be managed. It also is a central point that can facilitate reconfiguration events.

Component Template Classes

Component Resources is a base class that defines the functional implementation of a component object. For example, Base Config defines the functional implementation for configuring and accessing the network address per interface.

Interface Template Classes

Interface Resources is a base class that defines the functional implementation of an interface object. Performance counters of packets in/out and bytes in/out are maintained in this resource. Access to The interface number and certain interface states (like routing on/off) is accessed here.

G. MIB Navigator

This visual display mechanism allows a user to view and control the router resource tree (all router objects) with the semantics of a file system. Object containers are treated as directories while individual objects are treated as a file. This allows complete access into the communication system without explicit knowledge of communication/networking components. A user can start a root for example and peruse until the correct object (file) is provided. Note: this is inside an embedded system with no file system.

The MIB Navigator simplifies the manner in which a network administrator manages a networking device. It provides a line-oriented command line interface which allows the user to quickly browse a device's current configuration, as well as giving the user a more flexible and user-friendly interface to operate with. This interface provides a textual representation of the device's internal configuration database, allowing the user to be able to read or change the configuration of the device with little or no documentation.

The MIB Navigator provides its command line interface by operating a conceptual level above the Simple Network Management Protocol (SNMP). SNMP operates by passing requests to a device's internal database, the Management Information Base (MIB). The form of these requests are composed of queries to an object within that database, by using the object's identifier (OID), which is unique to that object within the database. However, these OID's are composed of a string of numerals (i.e., 1.3.6.1.2.1.1.1.0), making them difficult to understand or work with from a user's standpoint.

The MIB Navigator simplifies the format of these requests by providing a textual representation to these OID's, which are easier for the user to digest than a string of numerals. Along with mapping ASCII names to objects within the MIB, the MIB Navigator also places a "file system" type of hierarchy over the MIB. This hierarchical interface allows the device's router objects to be perused, just as a user would navigate around in a computer's file system. The user is now able to roam around the MIB, as if it were a computer file system, and check on pieces of data, and make changes where necessary without even being required to know the object's identifier. The user can change his/her current location (a "directory" in a file system) or he/she can examine the contents of an object (a "file" in a file system). The user may access a desired object by using its textual description, instead of its numerical identifier.

The textual representation of objects within the MIB is achieved by storing text strings, along with other data, for each object within the device. When an object is accessed, its corresponding text string is substituted for its numerical identifier, to provide a seamless interface to the object. The requirement that the user make use of the numerical identifier for an object in the MIB is removed, allowing that user to use the more informative and intuitive text strings instead.

Figure 18:
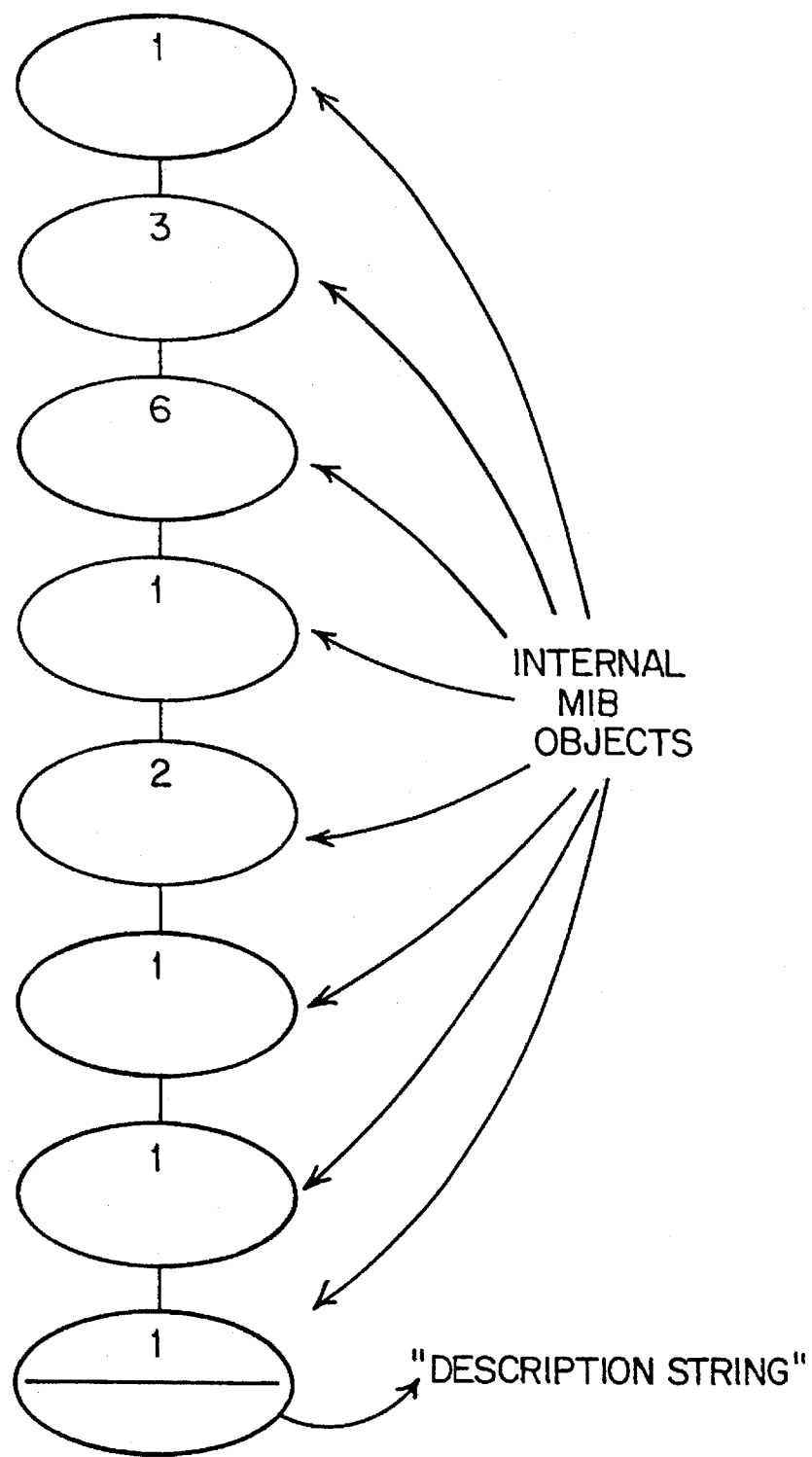
FIG. 18 is a schematic illustration of the method of accessing an object with the prior art SNMP method.

In FIG. 18, the prior SNMP methodology of accessing a piece of data via the device's configured name is shown. To access this data, the user must make a request of the MIB, and give the object's identifier (i.e., 1.3.6.1.2.1.1.1.0). Suppose the user has to make several accesses or changes, similar to the above. The user is now required to know each object's identifier, each of which can have an identifier of immense length. This becomes a very tedious task.

Figure 19:
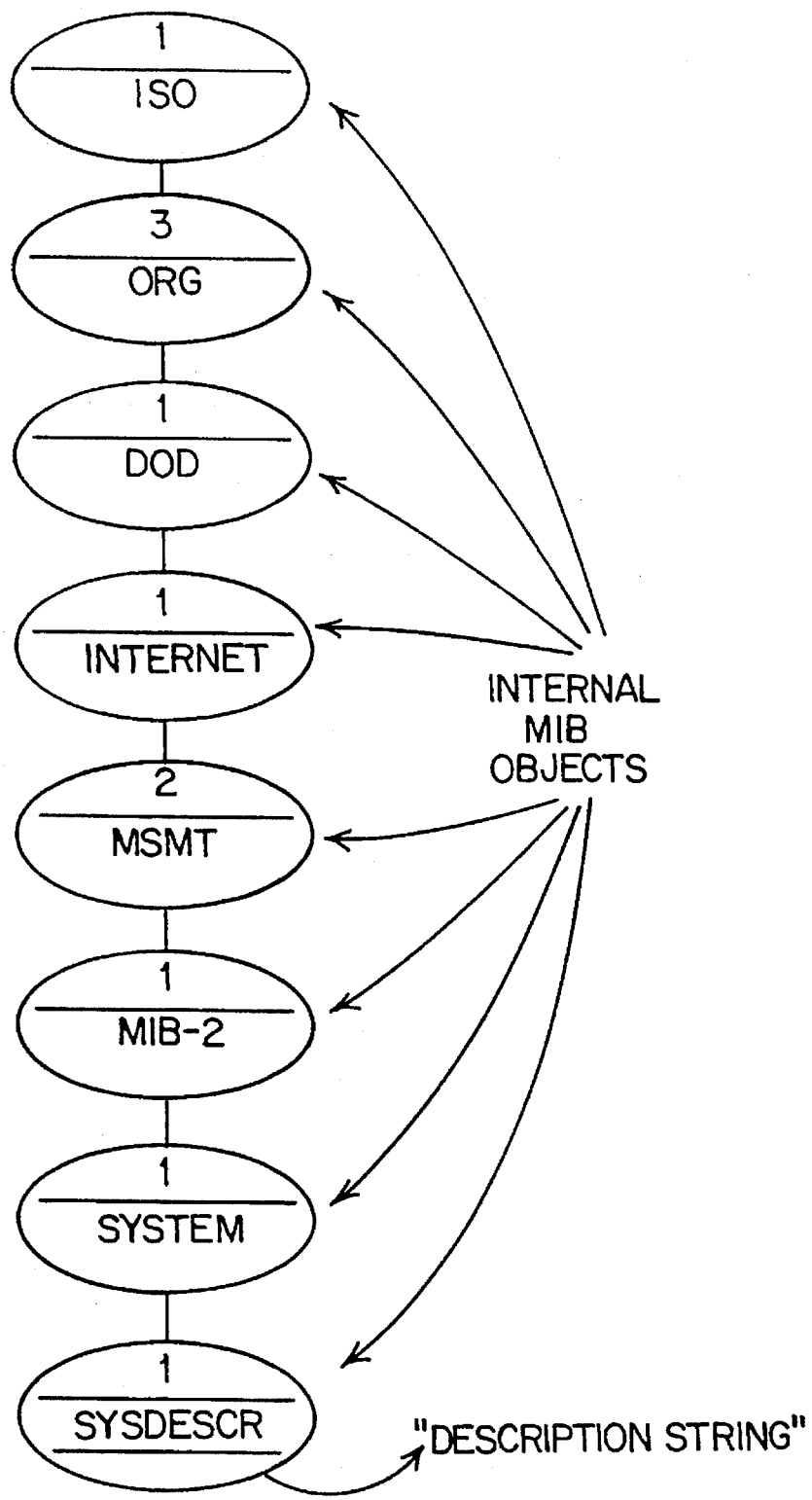
FIG. 19 is a schematic illustration of the new method of accessing an object using the MIB navigator.

In FIG. 19, the new methodology of accessing the same piece of data is shown. To access data, each object in the hierarchy is used by its textual name. Using the text string names for each object yields "get/iso/org . . . ". Since "mib-2" is a very common object to make use of, the user can change his/her current location to it, in order to shorten further accesses. Having done so, the above access is now shortened to "get system/sysDescr."

While there have been shown and described several embodiments of the present invention, it will be obvious to those skilled in the art that various changes and modifications may be made therein without departing from the scope of the invention as defined by the appending claims.

We claim:

1. A method of providing network routing services, including servicing and forwarding data packets, in a communications network including a plurality of interconnected multi-protocol routers, the data and methods for providing such services being united into fundamental logical building blocks of classes and objects, the method comprising:

providing a router resource object class for instantiating an autonomous router object, the router object including data and methods for:
 a) routing and system functions for forwarding and servicing data packets;
 b) configuration and control of network interfaces; and
 c) management of routing and system functions;

initializing each router object by instantiating a plurality of base objects common to a number of interconnectivity protocols and technologies;

binding each of the base objects to one or more protocols or network interfaces to provide protocol-specific bound objects; and in response to arrival of a data packet at one of the routers, calling one of the protocol-specific bound objects in order to service or forward the data packet.

2. The method of claim 1, including remotely managing the routing and system functions of the router object.

3. The method of claim 1, including storing the router objects in nonvolatile memory.

4. The method of claim 1, wherein the base objects have a common managed information base (MIB) structure.

5. The method of claim 1, wherein the data includes network topology information and the router objects exchange network topology information.

6. The method of claim 1, wherein wherein the routers are distributed across the network and provide access points to end systems, each router having a plurality of network interfaces for connections to other routers and end systems.

7. An apparatus for providing network routing services, including forwarding and servicing data packets, in a communications network including a plurality of interconnected multi-protocol routers, the apparatus comprising:

a processor and memory with a program of instructions wherein data and methods for providing network routing services are united into fundamental logical building blocks of classes and objects, the instructions including:

means for defining a router resource object class for instantiating an autonomous router object, the router object including data and methods for:
 a) routing and system functions for forwarding and servicing data packets;
 b) configuration and control of network interfaces;
 c) management of routing and system functions;

means for instantiating a plurality of base objects common to a number of interconnectivity protocols and technologies;

means for binding each of the base objects to one or more protocols or network interfaces to provide protocol-specific bound objects; and in response to arrival of a data packet at one of the routers, means for calling one of the protocol-specific bound objects in order to service or forward the data packet.

8. The apparatus of claim 7, wherein the memory includes a non-volatile memory for storing the objects.

9. The apparatus of claim 7, further including a network management system for remote management capability of the objects.

10. The apparatus of claim 7, wherein each router includes software and hardware for forwarding data packets at the network layer and exchanging network topology information.

11. The apparatus of claim 7, wherein the router object includes multiple instantiations of routing application objects for each individual protocol.

12. The apparatus of claim 7, wherein the router object includes multiple instantiations of forwarding objects for each individual protocol.

13. The apparatus of claim 7, wherein the base objects include at least one of: router services, router components, router interfaces, router configuration, and events.

14. The apparatus of claim 7, wherein the base objects have a common managed information base (MIB) structure and content which enables common control of routing applications.

15. The apparatus of claim 7, wherein the autonomous router object includes means to exchange network topology information and means to determine next-hop paths.

16. The apparatus of claim 7, further including means to allow a network layer protocol to register to receive network layer data packets matching framing and protocol identifier criteria.

17. The apparatus of claim 7, further including means for mapping a network layer address to a framing format, and means for mapping a physical layer address to a network layer address.

18. The apparatus of claim 7, wherein the base objects include a router event base class which allows an application thread to wait on multiple events simultaneously.

19. The apparatus of claim 7, wherein the base objects include a cache base class.

20. The apparatus of claim 7, wherein the base objects include an access control base class.

21. The apparatus of claim 7, wherein the routers are distributed across the network and provide access points to end systems, each router having a plurality of network interfaces for connections to other routers and end systems.

* * * * *